United States Patent
Nakata et al.

(10) Patent No.: US 6,198,506 B1
(45) Date of Patent: Mar. 6, 2001

(54) MULTIPOINT AUTOFOCUS SYSTEM HAVING A LINE SENSOR

(75) Inventors: Masahiro Nakata; Shigeru Iwamoto, both of Tokyo (JP)

(73) Assignee: Asahi Kogaku Kabushiki Kaisha, Tokyo (JP)

(*) Notice: Subject to any disclaimer, the term of this patent is extended or adjusted under 35 U.S.C. 154(b) by 0 days.

(21) Appl. No.: 09/475,665

(22) Filed: Dec. 30, 1999

Related U.S. Application Data

(62) Division of application No. 08/932,197, filed on Sep. 17, 1997, now Pat. No. 6,115,553.

(30) Foreign Application Priority Data

Sep. 17, 1996 (JP) .................................................. 8-245244
Sep. 17, 1996 (JP) .................................................. 8-245245
Sep. 26, 1996 (JP) .................................................. 8-255030

(51) Int. Cl.[7] .................................................. H04N 5/228
(52) U.S. Cl. .......................................... 348/222; 348/297
(58) Field of Search ...................................... 348/207, 220, 348/222, 345, 349, 350, 294, 295, 296, 297, 298; 396/310, 319, 320

(56) References Cited

U.S. PATENT DOCUMENTS

| 4,882,601 | 11/1989 | Taniguchi et al. . |
|---|---|---|
| 4,994,843 | 2/1991 | Kitazawa . |
| 5,144,357 | 9/1992 | Ishida et al. . |
| 5,151,583 | 9/1992 | Tokunaga et al. . |
| 5,189,465 | 2/1993 | Akashi et al. . |
| 5,311,241 | 5/1994 | Akashi et al. . |
| 5,397,887 | 3/1995 | Sensui . |
| 5,585,882 | 12/1996 | Akashi . |
| 5,612,761 | 3/1997 | Nakata . |
| 5,844,231 | 12/1998 | Suzuki et al. . |
| 5,845,155 | 6/1998 | Nakata et al. . |
| 5,856,663 | 1/1999 | Suzuki et al. . |
| 5,856,664 | 1/1999 | Suzuki et al. . |
| 5,872,661 | 2/1999 | Suzuki et al. . |
| 5,909,597 | 6/1999 | Hasushita . |
| 6,049,677 | * 4/2000 | Ueda et al. ........................... 396/319 |

* cited by examiner

Primary Examiner—Tuan Ho
(74) Attorney, Agent, or Firm—Greenblum & Bernstein P.L.C.

(57) ABSTRACT

A multipoint autofocus system includes a line sensor which receives object images and outputs a signal corresponding to a brightness thereof. The system also includes a controller having an A/D converter which converts the signal output from the line sensor to 10 bit digital data, and further converts the 10 bit digital data to one of 9 bit and 8 bit digital data, wherein a conversion precision of the A/D converter can be varied.

3 Claims, 16 Drawing Sheets

MULTIPOINT AUTOFOCUS SYSTEM HAVING A LINE SENSOR

This is a division of U.S. patent application Ser. No. 08/932,197, filed Sep. 17, 1997, U.S. Pat. No. 6,115,553, the contents of which are expressly incorporated by reference herein in its entirety.

BACKGROUND OF THE INVENTION

1. Field of the Invention

The present invention relates to a multipoint autofocus system for an optical instrument such as a camera 2. Description of the Prior Art A phase difference-type focus detecting system is known to be one of the focusing systems for a camera. In a phase difference-type focus detecting system, an object image within a focus detection zone is split into two images which are received by a CCD line sensor, whereat the images are converted to electrical image signals. The phase difference between the object images is detected in accordance with the electrical image signals which represent the two object images, so that a focus state (defocus) can be determined based on the phase difference thus detected.

In general, the detection of the chase difference and the defocus is carried out by a CPU (Central Processing Unit; Microcomputer). Therefore, the image signals (analogue signals) are converted to digital signals which can be processed in the CPU. The A/D conversion is in general carried out by an A/D corverter incorporated in the CPU.

Generally speaking, a sensitivity range of a CCD line sensor is narrower than an object brightness range in which the object can be photographed. Therefore, the light receiving time (integration time) of the CCD line sensor in which light is received is controlled or the amplification rate of the output voltage of the CCD line sensor is adjusted, in accordance with the object brightness, so that an output voltage approximately equal to the saturation output voltage of the CCD line sensor can be obtained regardless of the object brightness.

However, there are various kinds of CCD line sensors having different saturation output voltages. For example, the saturation output voltage of a CCD line sensor is more than one-half the full range of the A/D converter, but the saturation output voltage of another CCD line sensor is less than one-half the full range of the A/D converter. If a CCD line sensor whose saturation output voltage is less than one-half the full range of the A/D converter is used, the range of the converted data is narrow, so that the operation of the CCD line sensor is restricted.

In a multipoint autofocus system in which the focuses of objects in a plurality of focus detection zones can be detected, the object image is received by a line sensor (light receiving means) having a number of light receiving elements (e.g., photodiodes) for each focus detection zone and is converted to electric signals. The accumulated electric charges are integrated. When the integration value of each line sensor is a predetermined value, the integral operation of the line sensor is completed. The integral operation continues until the integration value becomes a predetermined value or a predetermined maximum integration time lapses, whichever is earlier. For a line sensor in which the integration value does not reach a predetermined value after the lapse of the maximum integration time, the predetermined value is replaced by a smaller reference value, and thereafter, the integration value is compared with the new reference value (smaller value) and thus, the gain (degree of amplification) of the integration value is increased. These operations are repeated in steps (stepwisely) until the integration value becomes the reference value which has been reduced stepwise. If the integration value does not eventually reach the reference value, the integral operation of the line sensor is forcedly stopped.

To detect the completion of the integral operation, the integration value of a monitor sensor provided adjacent to each line sensor is used in place of the integration value of the corresponding line sensor. Namely, the integration values of the monitor sensors are monitored to control the integration time of the line sensors, on the assumption that the relationship between the integration values of the monitor sensors and those of the line sensors corresponding thereto is kept constant.

The reference value to terminate the integral operation is set by a reference monitor sensor. The integration value of the monitor sensor could be different from the integration values of other monitor sensors. For instance, if the integration value (absolute value) of a monitor sensor is smaller than the integration value (absolute value) of the reference monitor sensor, the integral operation ends before the integration value of the corresponding line sensor reaches the predetermined reference value, so that the maximum integration value range in which the integration value can be processed cannot be effectively used. Conversely, if the integration value (absolute value) of a monitor sensor is larger than the integration value (absolute value) of the reference monitor sensor, the integral operation continues after the integration value of the corresponding line sensor has reached the predetermined reference value, since the integration value of the monitor sensor does not yet reach the predetermined reference value. Consequently, there is a possibility that the integration value of the line sensor exceeds the maximum integration value range in which the integration value can be processed. Moreover, in the case that the integration value of the reference monitor sensor reaches the predetermined reference value within the maximum integration time but the integration value of other monitor sensor(s) does not reach the predetermined reference value thus resulting in an increase in the gain, the integration value of the corresponding line sensor(s) may exceed the processable maximum integration value range.

In the former case, i.e., if the integration value of a monitor sensor is smaller than the integration value of the reference monitor sensor, since the integration value range is restricted, the integration value on a dark object portion in particular is too small that the image signal contains a large amount of noise (extraneous signal components), thus leading to a reduction in detection precision. In the latter case, i.e., the integration value of a monitor sensor is larger than the integration value of the reference monitor sensor, since the integration value of the line sensor exceeds the processable maximum integration value range, the integration value on a bright object portion in particular fluctuates, thus resulting in a reduction in detection precision.

Recently, various kinds of multi-point autofocusing systems have been introduced in which the focuses of objects within a plurality of focus detection zones are detected using the object distance measuring sensors as mentioned above. For instance, in a known multi-point autofocusing system, the focuses of objects within a horizontally extending central focus detection zone and a pair of vertically extending peripheral focus detection zones on opposite sides of the central focus detection zone, arranged in a generally H-shape on an image surface, are detected.

In this autofocusing system, the focus state of the object within a specific focus detection zone selected by a photographer is detected to perform the focusing operation or the focus state of the objects within the plural focus detection zones is detected and the object distance data determined based on the focus state is compared, so that the focusing operation is carried out to focus on, for example, the farthest or closest object.

However, upon taking a portrait picture or a scene against a blue sky background, if a defocus of the background (blue sky) whose contrast is low is obtained, there is a possibility that the focus control is carried out to focus on the blue sky. Alternatively, upon taking a picture of a person who is standing on the ground (e.g., on a road), if a defocus of the road portion closer to the camera than the person is obtained, the focus control may be carried out to focus on the road portion. Moreover, if no focus can be effectively detected for some focus detection zones, the automatic focusing operation cannot be effected or the focus is adjusted for a wrong object (unwanted or unintended object). Consequently, the intended object to be photographed is out of focus.

SUMMARY OF THE INVENTION

It is an object of the present invention to provide a focusing apparatus having a CCD line sensor, in which the focus can be precisely detected by increasing the resolution of an A/D converter.

Another object of the present invention is to provide a multi-point autofocusing system in which optimum detection data can be obtained for each focus detection zone.

Yet another object of the present invention is to provide a multi-point autofocusing system in which an intended object to be photographed can be correctly in focus even under poor conditions, for example if the contrast of the object is low or it is difficult to detect a single focus of a three-dimensional object.

According to an aspect of the present invention, there is provided a multipoint autofocus system having a detecting device for detecting a focus state of objects at different positions in a plurality of focus detection zones on an image surface; a selecting device for selecting focus data of one of the focus states detected by the detecting device, a focusing device for moving a focusing lens system in accordance with the selected focus data; a judging device for judging a contrast of the objects detected in the focus detection zones; and a control device for selecting data representing a shortest focus from among the focus data of the objects in the focus detection zones in which the judged object contrast is higher than a predetermined value.

Preferably the object contrasts of the objects in all of the focus detection zones are below the predetermined value, the focus data of an object in a central focus detection zone on the image surface is selected.

If effective focus data of the object in the central focus detection zone is not obtained, focus data representing the shortest focus is selected.

The focus data preferably represents an amount of defocus.

The detection of the focus state and the movement of the focusing lens system are repeatedly carried out. The defocus of the focus detection zone that has been selected in the previous operation has a priority to the defocuses of the focus detection zones that have not been selected in the previous operation.

The detection of the focus state and the movement of the focusing lens system are preferably repeatedly carried out and wherein the requirement to select the current defocus for the focus detection zone that has been selected in the previous operation is less strict than the current defocus for the focus detection zones that have not been selected in the previous operation.

Preferably, the detection of the focus state and the movement of the focusing lens system are repeatedly carried out and the defocus of the central focus detection zone on the image surface has a priority in selection to those of other focus detection zones.

Preferably, the detection of the focus state and the movement of the focusing lens system are repeatedly carried out and the defocus of the focus detection zone that has been selected in the previous operation is replaced by the defocus plus a predetermined amount of defocus to determine the current defocus.

According to another aspect of the present invention, a multipoint autofocus system is provided having a plurality of light receiving device which receive object images within a plurality of focus detection zones and perform an integration operation to integrate electric charges produced by a photoelectric conversion of optical signals of the object images; a plurality of monitor devices located adjacent to the light receiving devices for receiving and integrating the object images within the focus detection zones and for monitoring values of the electric charges that have been integrated of the corresponding light receiving device; an integration control device for stopping the integration operation of the corresponding light receiving device when the integration value monitored by the monitor device reaches a predetermined value; and a correction device for correcting the integration value of the light receiving device whose integration operation has been stopped by the integration control device, in accordance with a correction value to correct a difference in the integration value between the monitor device and the corresponding light receiving device.

Preferably, the correction device sets the correction values of other light receiving devices with reference to the light receiving device corresponding to a central focus detection zone on the image surface.

The predetermined value is preferably set based on an integration value of a central monitor device which monitors a central focus detection zone, so that the integration values of the light receiving device corresponding to other monitor devices can be set with reference to the central monitor device.

Preferably, a focus detection device is provided for terminating the integration operation when the integration operation of all the light receiving devices which have been permitted to conduct the integration operation ends, and for detecting the focus state of the focus detection zones in accordance with the integration values of the light receiving devices that have been corrected by the correction device.

In yet another aspect of the present invention, a multipoint autofocus system is provided having a plurality of light receiving devices which receive object images within a plurality of focus detection zones and perform an integration operation to integrate electric charges produced by a photoelectric conversion of optical signals of the object images; a counter device for counting an integration time of the light receiving devices; a plurality of monitor devices adjacent to the light receiving devices for receiving and integrating the object images within the focus detection zones and for monitoring values of the electric charges that have been integrated of the corresponding light receiving device; an integration control device for stopping the integration operation of the corresponding light receiving device when the integration value monitored by the monitor device reaches a predetermined value; a gain setting device for comparing a gain of the integration value of the light receiving devices that have not reached the predetermined value after a maximum integration time has lapsed, with the predetermined value that has been corrected in accordance with correction value to correct the integration value of the corresponding monitor device to thereby set the gain.

Preferably, the integration control device varies the predetermined value stepwise after the lapse of the maximum integration time to compare the modified predetermined value with the integration value by the monitor device.

The gain setting device preferably sets the gain by comparing the integration value with the predetermined value that has been successively corrected in accordance with the correction values to correct the integration value of the corresponding monitor device in an order of magnitude of absolute values of the correction values.

The integration control device compulsively stops the integration operation of all the light receiving device that have not reached the varied predetermined value.

In another aspect of the present invention, a multipoint-autofocus system is provided having a line sensor which receives object images and outputs a signal corresponding to a brightness thereof; and a control device having an A/D converter which converts the signal output from the line sensor to a digital signal. The conversion precision of the A/D converter can be varied. The line sensor is comprised of a CCD line sensor. The A/D converter converts the signal output of the CCD line sensor to 10 bit digital data and converts the 10 bit digital data to 9 bit or 8 bit digital data. The 10 bit digital data produced by the A/D converter is converted into 9 bit digital data when a saturation output voltage of the CCD line sensor is less than one-half of a full range of the A/D converter and wherein the 10 bit digital data produced by the A/D converter is converted into 8 bit digital data when the saturation output voltage of the CCD line sensor is greater than one-half of the full range of the A/D converter.

The present disclosure relates to subject matter contained in Japanese Patent Application Nos. 08-245244, 08-245245 (both filed on Sep. 17, 1996), and 08-255030 (filed on Sep. 26, 1996) and which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 1:
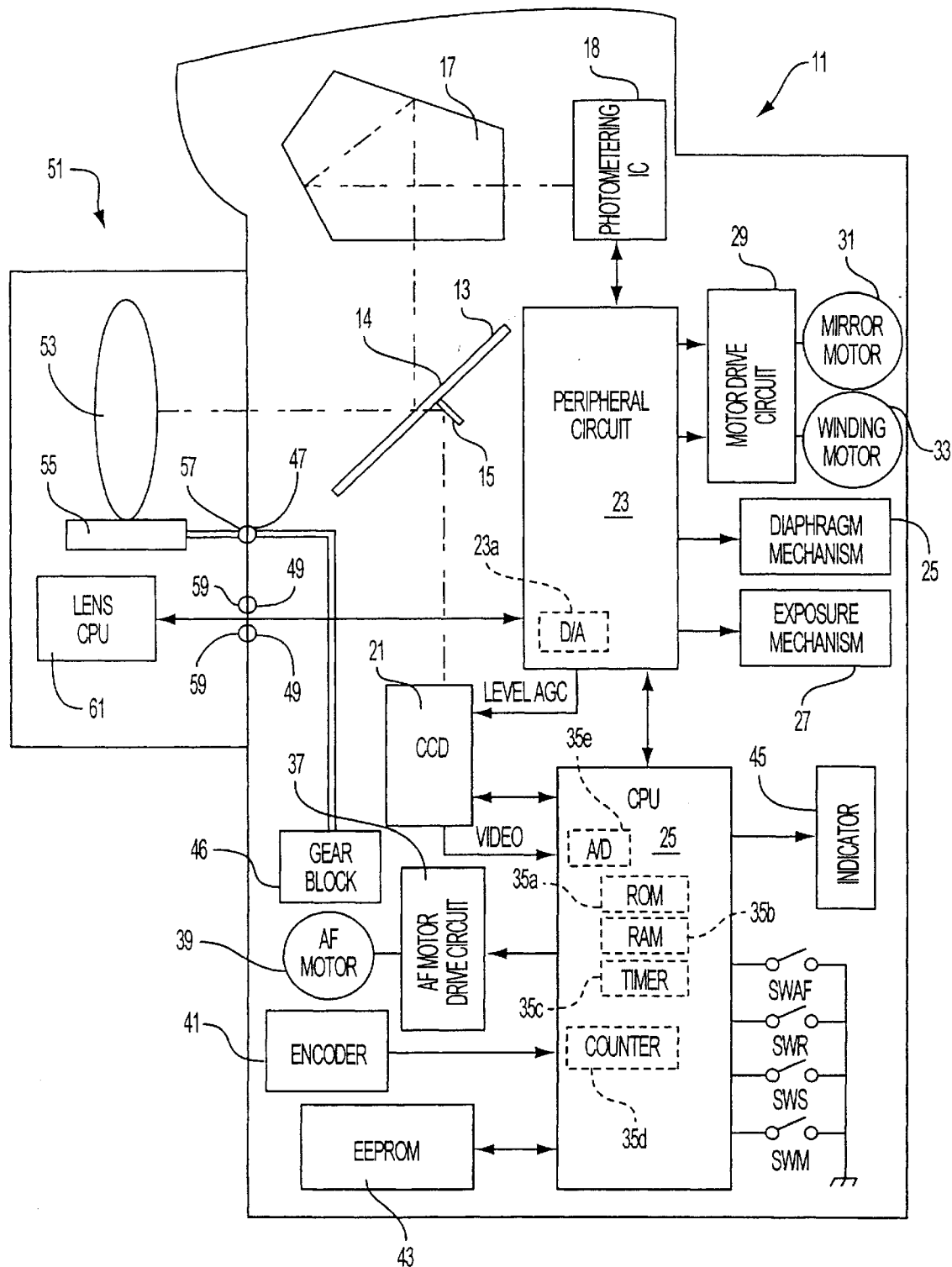
FIG. 1 is a block diagram of main components of a focusing system according to the present invention, applied to a single lens reflex camera.

FIG. 1 shows a block diagram of main components of an automatic focusing (AF) single lens reflex camera to which the present invention is applied. The AF single lens reflex camera consists of a camera body 11 and a photographing lens 51 which is detachably attached to the camera body 11. The camera body 11 is provided with a multipoint autofocusing system (a multipoint focus detecting system and an automatic focus adjusting system).

A large part of object light entering the camera body 11 through the photographing lens 51 is reflected by a main mirror 13 toward a pentagonal prism 17 which constitutes a finder optical system. The object light is thereafter reflected by the pentagonal prism 17 and is emitted from an eyepiece (not shown). A part of the light reflected by the main mirror 13 is made incident upon a light receiving element of a photometering IC 18. The object light incident upon a half-mirror portion 14 of the main mirror 13 is partly transmitted therethrough and is reflected downward by an auxiliary mirror 15 toward a multifocus detection sensor unit 21.

The object light is converted to an electrical signal which is subject to a logarithmic compression (voltage signal) in the photometering IC 18 and is supplied to a main CPU 35 as a photometering signal through a peripheral control circuit 23.

The main CPU 35 carries out a predetermined exposure operation in accordance with the photometering signal and film sensitivity data to determine an appropriate shutter speed and diaphragm value for the exposure. The photographing operation is carried out in accordance with the shutter speed and the diaphragm value thus obtained. Namely, an exposure mechanism (shutter mechanism) 25 and a diaphragm mechanism 27 are driven to expose the film (not shown). During the photographing operation, the peripheral control circuit 23 drives a mirror motor 31 through a motor drive circuit 29 to move the main mirror 13 upward or downward. Upon completion of the photographing operation, the peripheral control circuit 23 drives a film winding motor 33 to wind the film by one frame and charge the shutter.

The multifocus detection sensor unit 21 is in the form of a phase difference-type of distance metering sensor and consists of an optical beam splitting system which is adapted to split the object light which forms object images contained in a plurality of focus detection zones within an image plane into two light components, and three sensors 212A, 212B and 212C (FIG. 2) which receive the split beams of the object images and integrate the same (i.e., which convert the optical signal to an electric signal and accumulate the electric charges).

The main CPU 35 calculates the amount of defocus in accordance with integral data corresponding to each detection zone, supplied from the multifocus detection sensor unit 21. The defocus amount to be used and the priority thereof are set in accordance with the amounts of defocus to thereby calculate the direction of rotation and the number of revolutions of an AF motor 39 (i.e., the number of pulses to be output from an encoder 41). The main CPU 35 drives the AF motor 39 through an AF motor drive circuit 37 in accordance with the direction of rotation and the number of revolutions. The main CPU 35 detects and counts the pulses output from an encoder 41 in association with the rotation of the AF motor 39. When the counted number reaches the number of pulses mentioned above, the AF motor 39 is stopped.

The main CPU 35 can DC-drive the AF motor 39 at a constant speed using PWM control, in accordance with the pitch of the pulses output from the encoder 41. The AF motor 39 transmits its rotation to the photographing lens 51 through a connection between a joint 47 provided on a mount of the camera body 11 and a joint 57 provided on a mount of the photographing lens 51. Consequently, a focus adjusting lens 53 is moved by a lens drive mechanism 55.

The main CPU 35 is provided therein with a ROM 35a in which programs, etc., are stored, a RAM 35b in which data for the calculating operation and control operation is temporarily stored, a counting reference timer 35c, a counter 35d serving as hardware, and an A/D converter 35e.

An EEPROM 43 serving as an external memory is connected to the main CPU 35. The EEPROM 43 stores therein various inherent constants of the camera body 11 and predetermined values necessary for the integration control in the present invention.

A photometering switch SWS which is turned ON when a release button (not shown) is depressed by a half step, a release switch SWR which is turned ON when the release button is fully depressed, an automatic focusing switch SWAF which is actuated to switch between an automatic focus control and a manual focus control, and a main switch SWM which is adapted to control the power supply to the main CPU 35 and/or peripheral devices, etc., are connected to the main CPU 35. The main CPU 35 indicates the set AF mode, exposure mode, photographing mode, shutter speed, or diaphragm value, etc., in an indicator 45. In general, the indicator 45 includes two indicators provided on the outer surface of the camera body 11 and within the field of view of the finder.

The main CPU 35 functions as a control means which generally controls the camera body 11 and the photographing lens 51. The main CPU 35 constitutes an integration control means together with the multifocus detection sensor unit 21 and the peripheral control circuit 23, etc., and constitutes a lens drive means together with the AF motor 39, etc.

The photographing lens 51 is provided therein with the focus adjusting mechanism 55 which moves the focus adjusting lens 53 in the optical axis direction, the lens joint 57 which can be connected to the camera joint 47 of the camera body 11 through a gear block 46 to transmit the rotation of the AF motor 39 to the focus adjusting mechanism 55, and a lens CPU 61.

The lens CPU 61 is connected to the peripheral control circuit 23 of the camera body 11 through groups of electric contacts 59 and 49 to perform data communication with the main CPU 35. Data supplied from the lens CPU 61 to the peripheral control circuit 23 includes controllable open diaphragm value Av (apex value in terms of the open f-number), the maximum diaphragm value Av (apex value in terms of the minimum f-number), lens position data, and K-value data, etc. The K-value data refers to pulse data representing the number of pulses (number of revolutions of the AF motor 39) output from the encoder 41 during the movement of the image plane on which the object images are formed by the photographing lens 51 by a unit displacement (e.g., 1 mm) in the optical axis direction by the AF motor 39.

In the single lens reflex camera, the AF operation begins when the photometering switch SWS is turned ON. In the AF operation, the multifocus detection sensor unit 21 commences the integration operation. Upon completion of the integration operation, the main CPU 35 calculates the defocus amount and the number of drive pulses in accordance with the integration values input thereto. Consequently, the AF motor 39 is driven in accordance with the number of drive pulses.

Figure 2:
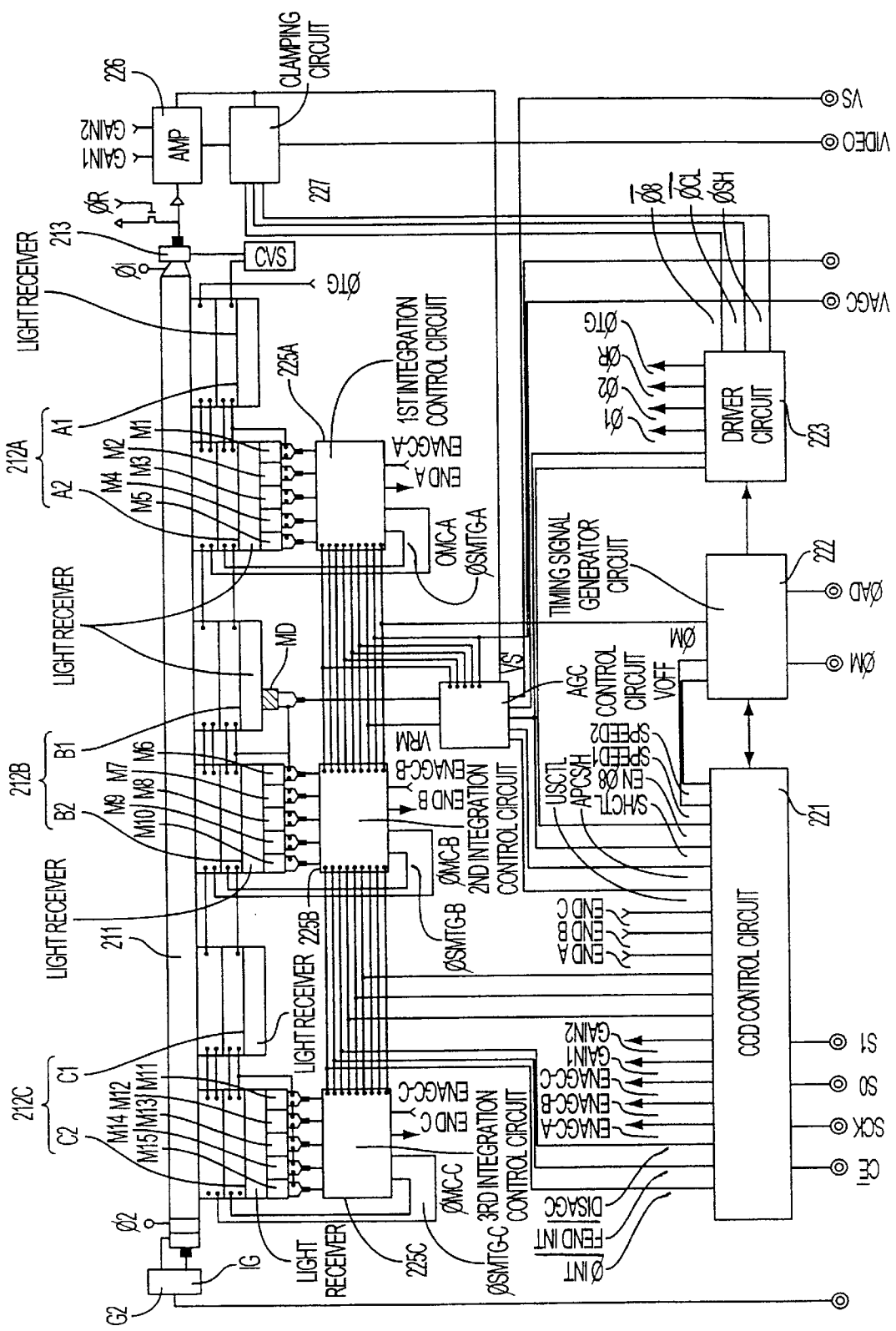
FIG. 2 is a schematic diagram of an example of a multi-focus detection sensor unit in the single lens reflex camera shown in FIG. 1.

The object light incident upon the photographing lens 51; transmitted through the central half mirror portion 14 of the main mirror 13; and reflected by the auxiliary mirror 15, is made incident upon the multifocus detection sensor unit 21. The object light incident upon the multifocus detection sensor unit 21 is converged onto a secondary image forming surface conjugate with a film surface or in the vicinity thereof, and passes through three openings formed on a mask provided on the secondary image forming surface. Thus, the rays of the object image are converged onto the respective light receiving means (FIG. 2). Note that the three openings define the focus detection areas (zones). The light in each focus detection area is split into two by a beam splitter and is converged onto respective light receivers provided on the image reforming surface.

The multifocus detection sensor unit 21 includes a CCD line sensor, which serves as a sensor. Looking at FIG. 2, the multifocus detection sensor unit 21 consists of a CCD transfer portion 211, and the three spaced sensors 212A, 212B and 212C which serve as light receiving means, which are arranged close to the CCD transfer portion 211 along the longitudinal direction thereof. The sensors 212A, 212B and 212C are each provided with a pair of light receivers A1, A2; B1, B2; C1, C2. As is well known, the light receivers A1, A2; B1, B2; and C1, C2 are each made of a photodiode (pixel) array having photodiodes that are spaced at a predetermined distance along a line.

Although the light receivers A1, A2; B1, B2; and C1, C2 are spaced in the illustrated embodiment, the light receivers of each pair can be continuously interconnected.

The sensors 212A, 212B and 212C are provided with storage portions in which electric charges produced by the photodiodes of the light receivers A1, A2, B1, B2, C1 and C2 are integrated (accumulated) for each photo diode, and memory portions in which the electric charges accumulated in the storage portions are temporarily stored when the integration operation is completed. Namely, the electric charges produced by the photodiodes which have received the object light are stored in the storage portions, and the electric charges integrated in the storage portions are transferred to and held in the memory portions upon completion of the integration operation. When the integration operations of all of the sensors 212A, 212B and 212C are complete, the electric charges held in the memory portions are transferred to the CCD transfer portion 211 simultaneously. The CCD transfer portion 211 is provided with a number of spaced electrodes (not shown), so that the electric charges are transferred stepwise for each pixel, in response to the two-phase transfer clocks $\phi 1$, $\phi 2$ applied to the electrodes. Thereafter, the transferred electric charges are converted to voltage signals by an output converter 213 (reading portion) of the CCD transfer portion 211 and are output therefrom.

The voltage signal output from the output converter 213 is amplified by an amplifier 226 and is output as a video signal VIDEO as a voltage signal which is produced in connection with a reference level, from a clamping circuit 227. The video signal VIDEO output from the clamping circuit 227 is supplied to the main CPU 35 where the video signal is converted to a digital signal by the A/D converter 35e and is stored in the RAM 35b for each pixel. The stored digital signals can be used for the calculation of the defocus amount.

Figure 3:
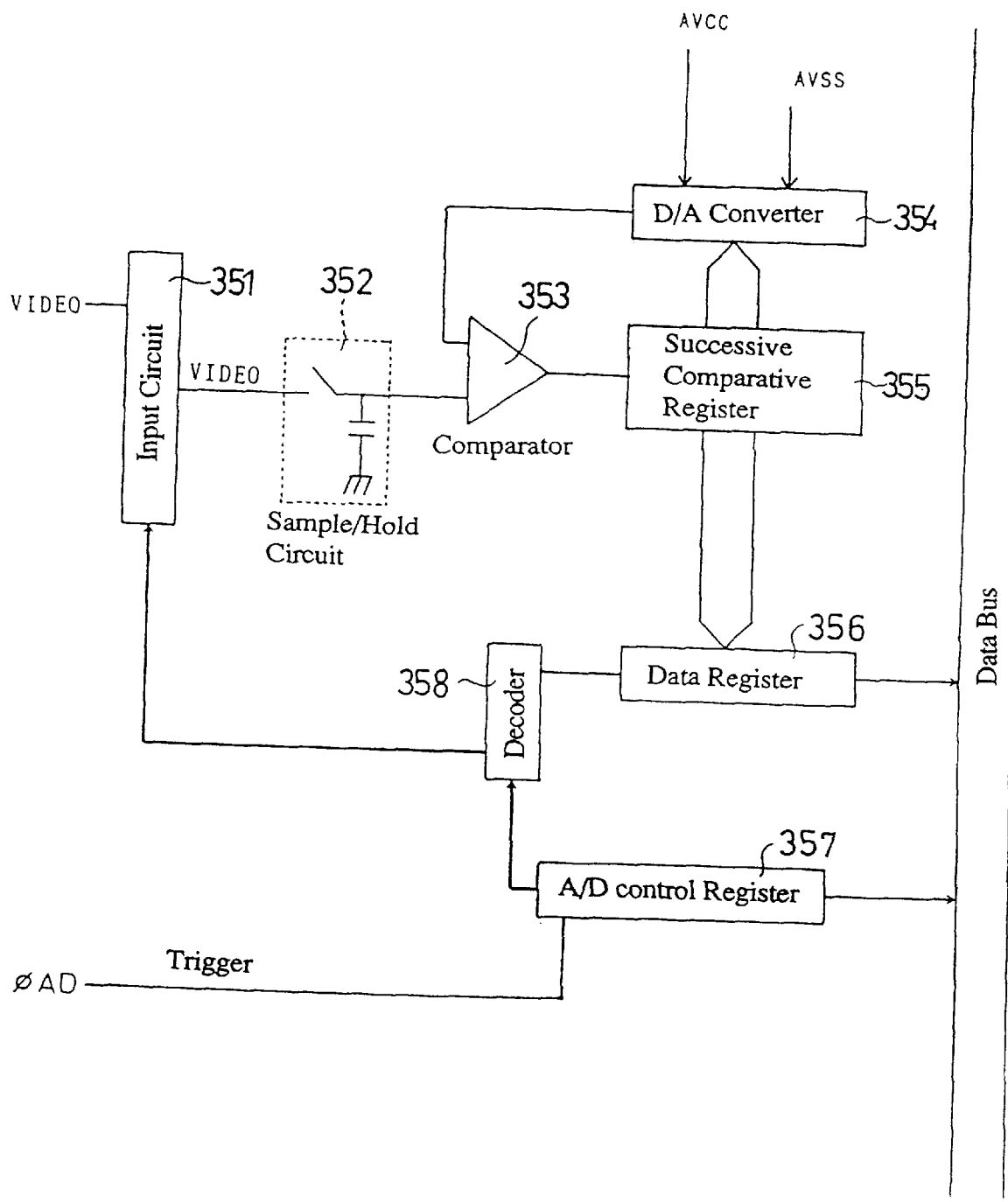
FIG. 3 is a block circuit diagram of an A/D converter incorporated in a CPU of the single lens reflex camera shown in FIG. 1.

In FIG. 3 which shows a block diagram of the A/D converter 35e of the CPU 35 by way of example, the video signals VIDEO supplied to the input circuit 351 are held by a sampling/holding circuit 352 and are successively compared with the voltage output from a D/A converter 354 by a comparator 353. The comparison results are successively written in a comparator register 355. The D/A converter 354 has a resolution of 10 bits and the full range thereof is the reference voltage AVCC. When the comparison for 10 bits is complete, the contents of the comparator register 355 are successively transferred to a data register 356 and are written in the RAM 35b at predetermined addresses thereof through a data bus.

The conversion from 10 bits to 9 bits or 8 bits is effected to make it possible to process the same in the full range of the A-D converted value of 8 bits even if the maximum level of the video signal VIDEO is less than one-half the full range of the A/D converter 35e. Therefore, 10-bits data of the data register 355 is multiplied by one-half or one-fourth to shift the same to a lower place to thereby obtain data whose lower 8 bits are approximately identical in precision to 8 or 9 bit data. For example, if the saturation output voltage of the sensor agrees with the full range of the A/D converter 35e, the AGC level (integration completion level VRM) is set so that the output of a uniform brightness object image is approximately 70% of the saturation output, so that the A-D converted value whose precision is equal to that of 8 bit data can be obtained. If the saturation output voltage of the sensor does not agree with the full range of the A/D converter 35e, it is assumed that the saturation output voltage is one-half the full range of the A/D converter 35e, and then, the AGC level (integration completion level VRM) is set so that the output of a uniform brightness object image is approximately 70% of the assumed saturation output, so that the A-D converted value whose precision is equal to that of 9 bit data can be obtained. If the saturation output voltages of the multifocus detection sensor unit 21 are not identical, the full range (0 to FF) of the A-D converted value of 8 bits can be used.

The above-mentioned A-D conversion operation is carried out for the video signals VIDEO of all pixels of the sensors 212A through 212C.

In order to control the integration time (completion of the integration operation) of the sensors 212A, 212B and 212C in accordance with the brightness of the object, monitor sensors MA, MB, MC are provided adjacent to the sensors 212A, 212B and 212C to monitor the integration values (quantity of the received light) of the sensors. A monitor dark sensor MD is provided close to the first light receiver B1 of the second sensor 212B. The monitor sensors MA, MB, MC receive the object light and output the integration values which are detected by the integration control circuits 225A, 225B and 225C. The monitor dark sensor MD which is optically isolated, is adapted to obtain a signal to remove the dark current component of the monitor sensors MA, MB and MC.

The monitor sensors MA, MB and MC are located adjacent to the light receiving areas of the light receivers A2, B2 and C2 of the sensors 212A, 212B and 212C and include monitor sensors M1 through M5, M6 through M10, and M11 through M15, respectively, which receive the object light incident upon the light receiving areas thereof which are each split into five light receiving areas.

The integration operation (accumulation of the electric charges) of the three sensors 212A, 212B and 212C, the transfer of the electric charges (integration values) from the sensors 212A, 212B and 212C to the CCD transfer portion 211, the transfer of the electric charges in the CCD transfer portion 211, the conversion of the electric charges to the voltage signals in the output converter 213, the clamping operation of the clamping circuit 227, etc., are driven in accordance with the clock signals (pulse signals) output from the CCD control circuit 221, a timing signal generator circuit 222, and a driver circuit 223.

The output of the dark sensor MD is used to correct the integral completion level of an AGC control circuit 224, and the outputs of the monitor sensors M1 through M5, the monitor sensors M6 through M10, and the monitor sensors M11 through M15 are used to control the integral operations of first, second and third integral control circuits 225A, 225B and 225C, respectively.

Figure 4:
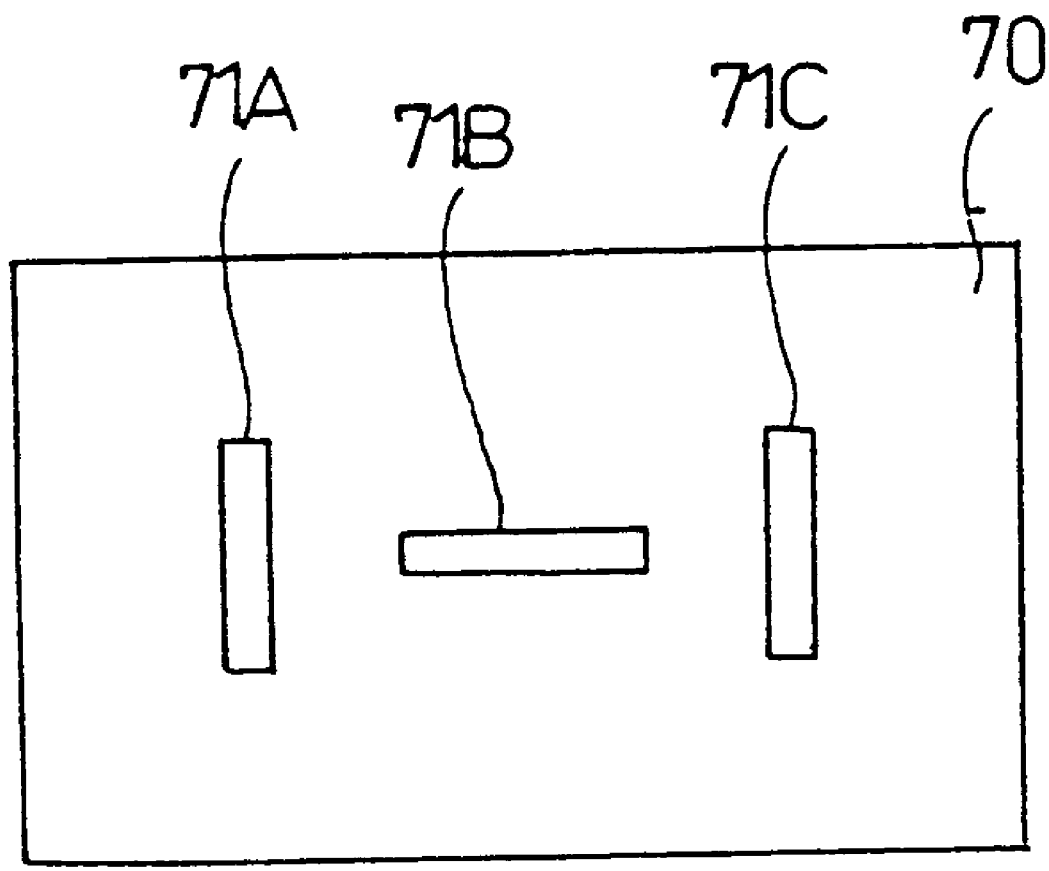
FIG. 4 is an explanatory view of focus detection zones of a multi-focus detection sensor unit in the single lens reflex camera shown in FIG. 1, by way of example.
Figure 5:
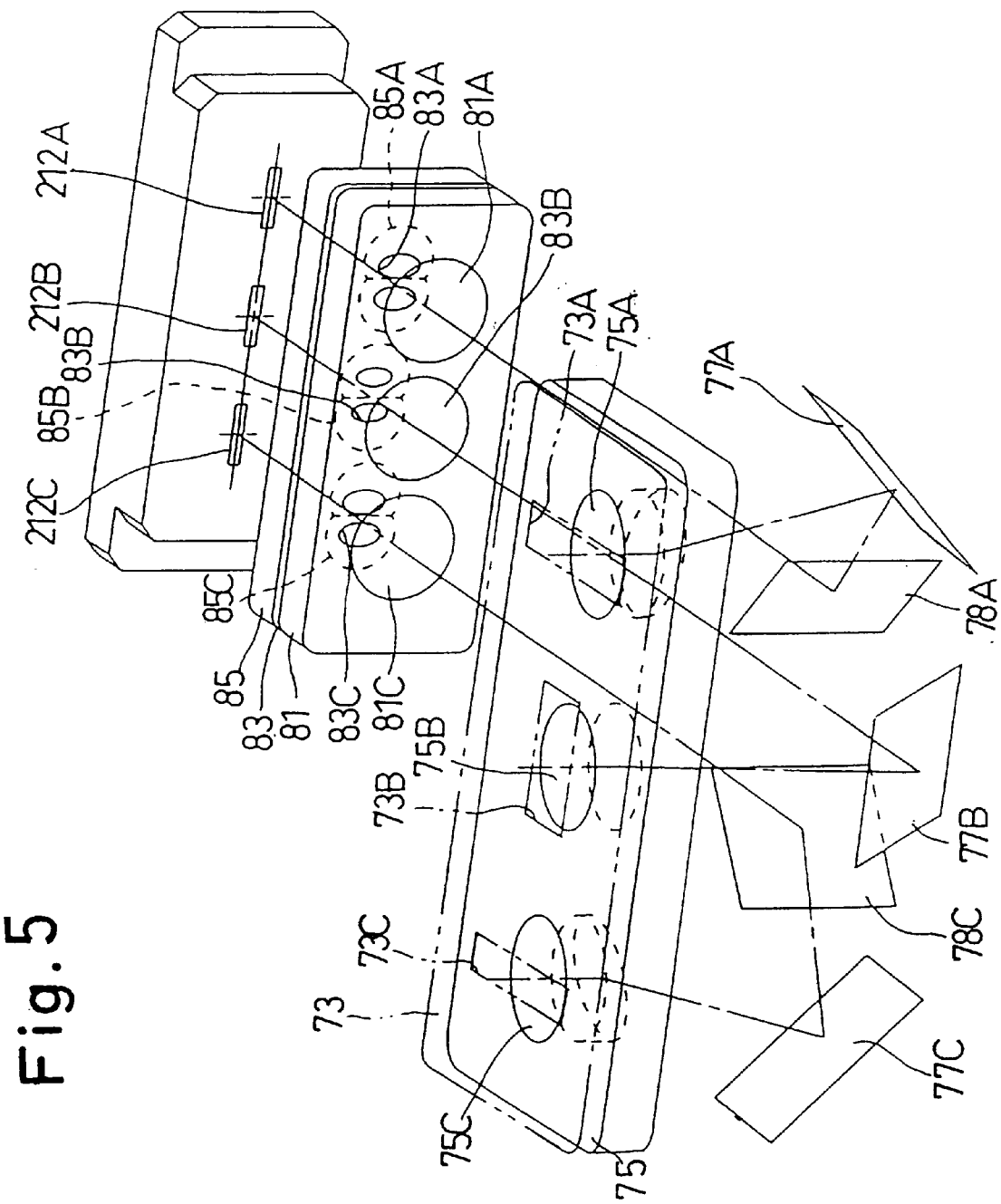
FIG. 5 is a schematic view of an example of an optical system of a multi-focus detection sensor unit in the single lens reflex camera shown in FIG. 1.

The arrangement of the focus detection zones of the multifocus detection sensor unit 21 is shown in FIG. 4 by way of example. An embodiment of the optical system thereof is shown in FIG. 5.

There are three focus detection zones 71A, 71B and 71C corresponding to the sensors 212A, 212B and 212C. The focus detection zones 71A, 71B and 71C are arranged substantially in the form of an H in the image surface 70, but the sensors 212A, 212B and 212C are aligned along a line. With the optical system shown in FIG. 4, the object lights within the three focus detection zones arranged in the H-shape are made incident upon the sensors 212A through 212C aligned along a line.

The multifocus detection sensor unit 21 includes a cover (focus detection zone restricting plate) 73 which is provided with rectangular openings 73A, 73B, 73C through which the object light is partly transmitted in a predetermined focal plane (located at a position conjugate with a film surface not shown) on which the object image is formed by the photographing lens 51 or in the vicinity thereof. The openings 73A, 73B and 73C are arranged substantially in the form of an H (a first pattern) and define the focus detection zones. Namely, the focus detection is effected for the object image whose contour is rectangular and which is transmitted through the openings (focus detection zones) 73A, 73B and 73C.

The center opening 73B whose center is located on the optical axis of the photographing lens is laterally elongated and the right and left (perimetric) openings 73A and 73C are elongated in the direction perpendicular to the length of the center opening 73B, in the field of view of the finder.

Condenser lenses 75 (75A, 75B, 75C) are provided behind the cover 73, which correspond to the openings 73A, 73B and 73C and which function as relay lenses. A center mirror 77B is located behind the center opening 73B to deflect the light passing through the center opening 73B and the condenser lens 75B by 90°. A first pair of first and second perimetric mirrors 77A and 78A are located behind the perimetric opening 73A to deflect the light passing through the perimetric opening 73B and the condenser lens 75A by 90°, respectively. Similarly, a second pair of first and second perimetric mirrors 77C and 78C are located behind the perimetric opening 73C to deflect the light passing through the perimetric opening 73C and the condenser lens 75C by 90°, respectively.

The first and second pairs of first and second perimetric mirrors 77A, 78A and 77C, 78C are each adapted to deflect the object light by 90° about the axis. Namely, in the illustrated embodiment, the rectangular focus detection zones defined by the perimetric openings 73A, 73C are rotated in the clockwise direction and the counterclockwise direction, so that the focus detection zones are aligned with the focus detection zone defined-by the center opening 73B.

An auxiliary lens 81, a mask 83, a separator lens 85, and line sensors 212A, 212B, 212C are provided behind the center mirror 77B and the second perimetric mirrors 78A, 78C. The auxiliary lens 81 consists of three auxiliary lens elements 81A, 81B, 81C corresponding to the openings 73A, 73B, 73C, respectively. Similarly, the mask 83 consists of three openings 83A, 83B, 83C, each having a pair of openings, corresponding to the openings 73A, 73B, 73C, respectively; and the separator lens 85 consists of three separator lenses 85A, 85B, 85C, each having a pair of lens elements, corresponding to the openings 73A, 73B, 73C, respectively. The pairs of separator lens elements 85A, 85B, 85C are adapted to split the object light passing through the openings 73A, 73B, 73C and form object images on the sensors 212A, 212B, 212C (light receivers A1, A2; B1, B2; C1, C2) corresponding to the openings 73A, 73B, 73C, i.e., the focus detection zones 71A, 71B, 71C.

The focus detection operation of the single lens reflex camera is carried out as follows.

The CPU 35 operates when the photometering switch SWS is turned ON. When the photometering switch SWS is turned ON, the CCD control circuit 221 issues the integral commencement signal φINT in accordance with communication data supplied from the CPU 35, so that the sensors 212A, 212B, 212C and the monitor sensors MA, MB, MC commence the integration operation.

When the integration control circuits 225A through 225C detect that the integration values of the monitor sensors MA through MC are above a predetermined integration completion level VRM, and consequently, the integration control circuits output the integral termination signal END-A through END-C, the corresponding sensors 212A through 212C terminate the integration operation. In the illustrated embodiment, when the integration value of any one of the five monitor sensors M1 through M5 (or M6 through M10, or M11 through M15) of the monitor sensor MA (or MB or MC) reaches the predetermined level VRM, the integration control circuit 225A (or 225B or 225C) terminates the integration operation of the sensor 212A (or 212B or 212C). The integration completion level VRM is determined in accordance with the reference signal (VAGC level) supplied from the peripheral control circuit 23 and the dark current MD supplied from the monitor dark sensor MD.

Upon completion of the integration operation of all of the sensors 212A, 212B and 212C, a transfer pulse φTG is output from the driver circuit 223, so that the electric charges (signals) integrated by the sensors 212A, 212B and 212C are transferred to the CCD transfer portion 211. The signal charges transferred to the CCD transfer portion 211 are transferred in the CCD transfer portion 211 for each pixel, in accordance with the transfer/read clocks φ1, φ2 which are generated in synchronization with the reference clock φM. The signal charges are successively converted to voltage signals for each pixel at the output converter 213 and are output (read) therefrom. The voltage signals are amplified by the amplifier 226; are clamped by the clamping circuit 227; and are output as the video signal VIDEO for each pixel. The clamping circuit 227 sample-holds the output in synchronization with the hold pulse φSH and outputs the same as the video signal VIDEO.

The CPU 35 controls the built-in A/D converter 35e which converts the video signals input thereto to 10 bit digital signals and multiplies the latter by two or four to obtain 8 bit or 9 bit digital signals which are written in the RAM 35b.

If the integration operation of all the sensors 212A through 212C is not completed within a predetermined maximum integration time, i.e., if the integration value of any of the monitor sensors MA, MB, MC does not reach the integration completion level within the maximum integration time, the following operations are carried out.

In a first embodiment, the integration operation of all the sensors that have not completed the integration operation within the maximum integration time is forcibly stopped. The forcible termination of the integration operation is carried out in accordance with the compulsory integral stop signal FENDint supplied from the CCD control circuit 221 to the corresponding integration control circuits 225A through 225b and the integral termination signal output from the latter. The CPU 35 counts the integration time when the integration operation begins, and detects the integration time (lapse time) of the integration control circuits 225A through 225C in response to the integral termination signal supplied from the integration control circuits 225A through 225C.

In a second embodiment, the integration value of the monitor sensor(s) MA and/or MB and/or MC that has (have) not completed the integration operation within the maximum integration time is compared with a ½ integration completion level (i.e., ½×VRM). If the integration value is above the ½ VRM, the integration operation is terminated. If the integration value does not reach the ½ VRM, the gain of the amplifier 226 is multiplied by two, and the integration value is compared with a ¼ integration completion level (i.e., ¼×VRM). The integration value is then compared with the ¼ VRM. If the integration value reaches the ¼ VRM, the integration operation is terminated. If the integration value does not reach the ¼ VRM, the gain of the amplifier 226 is multiplied again by two (i.e., four in total), and the integration value is compared with a ⅛ integration completion level (i.e., ⅛×VRM). The integration value is compared with the ⅛ VRM. If the integration value reaches the ⅛ VRM, the integration operation is terminated. If the integration value does not reach the ⅛ VRM, the gain of the amplifier 226 is multiplied again by two (i.e., eight in total), and the integration operation is forcedly stopped.

The above discussion has been addressed to the basic integration operation of the multifocus detection sensor unit 21 using the CCD line sensor. There is a possibility that the integral characteristics of the sensors 212A, 212B, 212C (A sensor 212A, B sensor 212B, C sensor 212C) or those of the monitor sensors MA, MB, MC corresponding thereto are not identical to those on design.

Figure 6:
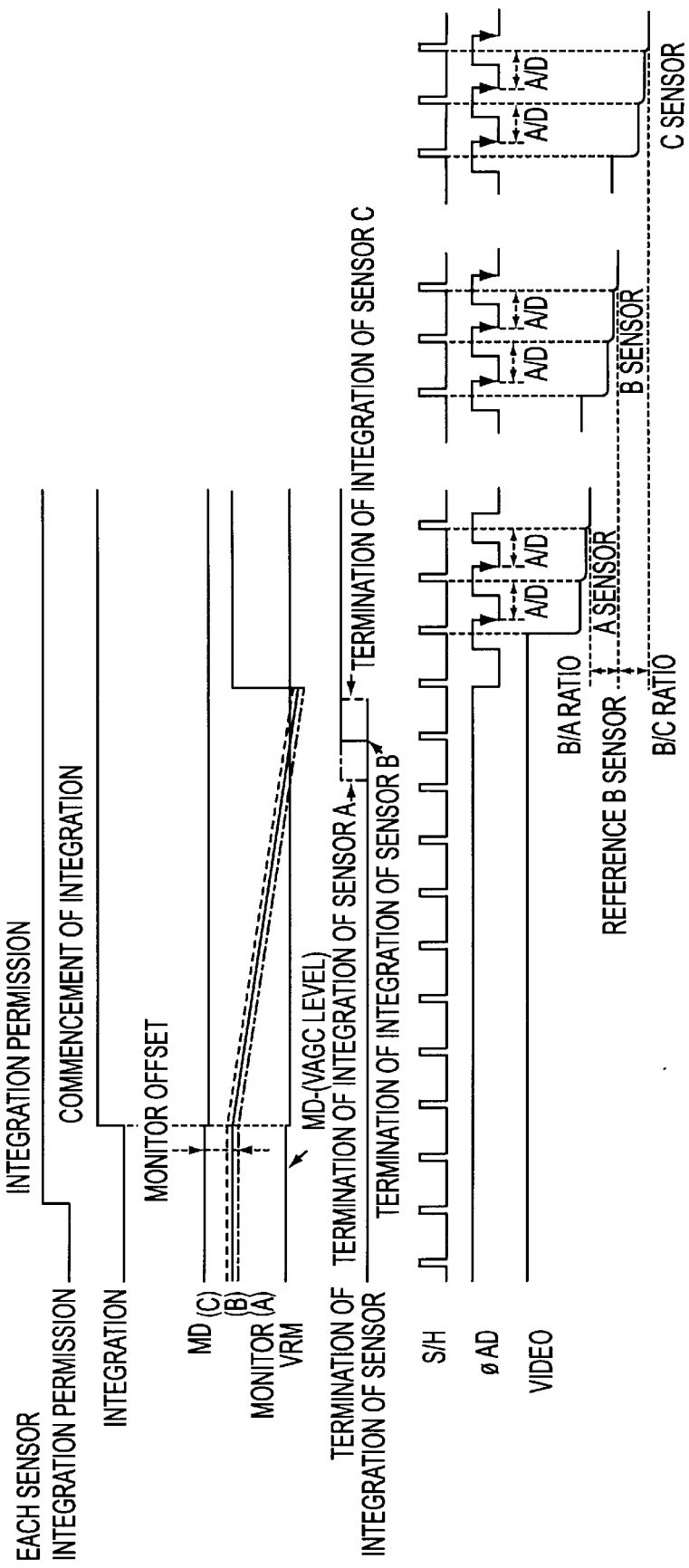
FIG. 6 is a timing chart of integral operations of multi-focus detection sensors shown in FIG. 1.

FIG. 6 shows a timing chart of the integration operation when the monitor sensors MA, MB, MC receive the images of objects having an identical brightness. In FIG. 6, the monitor offsets (initial integration values) of the monitor sensors MA, MB, MC in the reset state are different from each other. Therefore, in spite of the identical object brightness, the monitor sensors MA, MB, MC terminate the integration operation in this order since the integration values thereof reach the integration completion level VRM at different times. Among the sensors 212A through 212C, the sensor 212C requires the longest integration time, and hence, the integration value of the third sensor 212C is largest. The integration value of the first sensor 212A is smallest and the integration value of the second sensor 212B is an intermediate value between the largest value and the smallest value. In this case, the integration value of the third sensors 212C may exceed the controllable maximum range of the main CPU 35, and only the limited portion (lower portion) of the effective range can be used for the integration value of the first sensor 212A, thus resulting in a reduced measurement precision.

To prevent this, in the present invention, an output ratio of the monitor sensors MA, MB, MC as a correction value to correct or eliminate an error of the integration values of the sensors 212A through 212C, or monitor offsets MAoffset, MBoffset and MCoffset of the monitor sensors MA, MB, MC as integration value error correction values to make it possible to use the controllable maximum integral range are stored in the EEPROM 43. Upon the integration operation, the output ratio or the monitor offsets are read from the EEPROM 43 and are used to correct the integration values of the sensors 212A through 212C or correct the integration completion level of the sensors 212A through 212C. The monitor offsets MAoffset, MBoffset and MCoffset of the monitor sensors are defined by differences between the level of the monitor dark sensor MD and the levels of the monitor sensors MA, MB, MC in the initial position thereof before the integration operation begins.

In this embodiment, the output ratio of the first and third sensors 212A and 212C is set based on the output of the second sensor 212B whose focus detection zone corresponds to the center portion of the image surface. When the integration values of the sensors 212A through 212C are supplied as video signals to the CPU 35, and the first sensor 212A and the third sensor 212C are converted to digital signals by the A/D converter 35e, the correction based on the output of the second sensor 212B is carried out. The corrected values are (output of the second sensor)/(output of the first sensor), (output of the second sensor)/(output of the second sensor), (output of the second sensor)/(output of the third sensor). In this embodiment, the CPU 35 functions as a correction means for correcting the integration values of the sensors 212A through 212C.

In another embodiment of the integration operation, upon setting the gain of the integration value of the sensors that have not completed the integration operation within the maximum integration time (i.e., upon setting the degree of amplification of the amplifier 226), the integration completion level VRM is corrected based on the corresponding monitor offsets MAoffset, MBoffset, and MCoffset, so that the gain of the amplifier 226 can be set in accordance with the corrected integration completion level VRM.

In the prior art, if the integration operation is not completed within the maximum integration time, the integration completion level is multiplied by ½ and is compared with the integration value, and the gain (magnification) of the integration value of the sensor 212A, 212B or 212C that has not completed the integration operation is multiplied by two. This operation is repeated. If there is an error (difference) in the integration value between the monitor sensors MA, MB, MC and the corresponding sensors 212A through 212C, and in particular if the monitor offset MAoffset of the monitor sensor MA or the monitor offset MCoffset of the monitor sensor MC is smaller than the monitor offset MBoffset of the reference monitor sensor MB, it can be judged that the integration value of the reference monitor sensor MB has reached the integration completion level VRM, but the integration value (absolute value) of the monitor sensor MA or MC has not yet reached the integration completion level VRM. Consequently, the integration value of the monitor sensor MA or MB is gained by multiplication of 2 n power. If this occurs, the gained integration value may exceed the maximum integral range and thus the latter is saturated. Namely, the integration values for the bright portions of the objects formed on the sensors 212A through 212C are equalized, thus resulting in no contrast.

To prevent this, in the illustrated embodiment of the present invention, the integral errors of the sensors 212A through 212C and the monitor sensors MA, MB, MC are measured in advance, so that the integration completion level VRM is corrected in accordance with the monitor offsets MAoffset, MBoffset and MCoffset stored in the EEPROM 43. Namely, if there is a sensor 212A, 212B or 212C which has not completed the integration operation within the maximum integration time, the integration completion level VRM is corrected by the monitor offset MAoffset, MBoffset or MCoffset of the monitor sensor MA, MB or MC, and is compared with the integration value of the monitor sensor MA, MB or MC corresponding to the corrected integration completion level VRM to control the gain.

Figure 7:
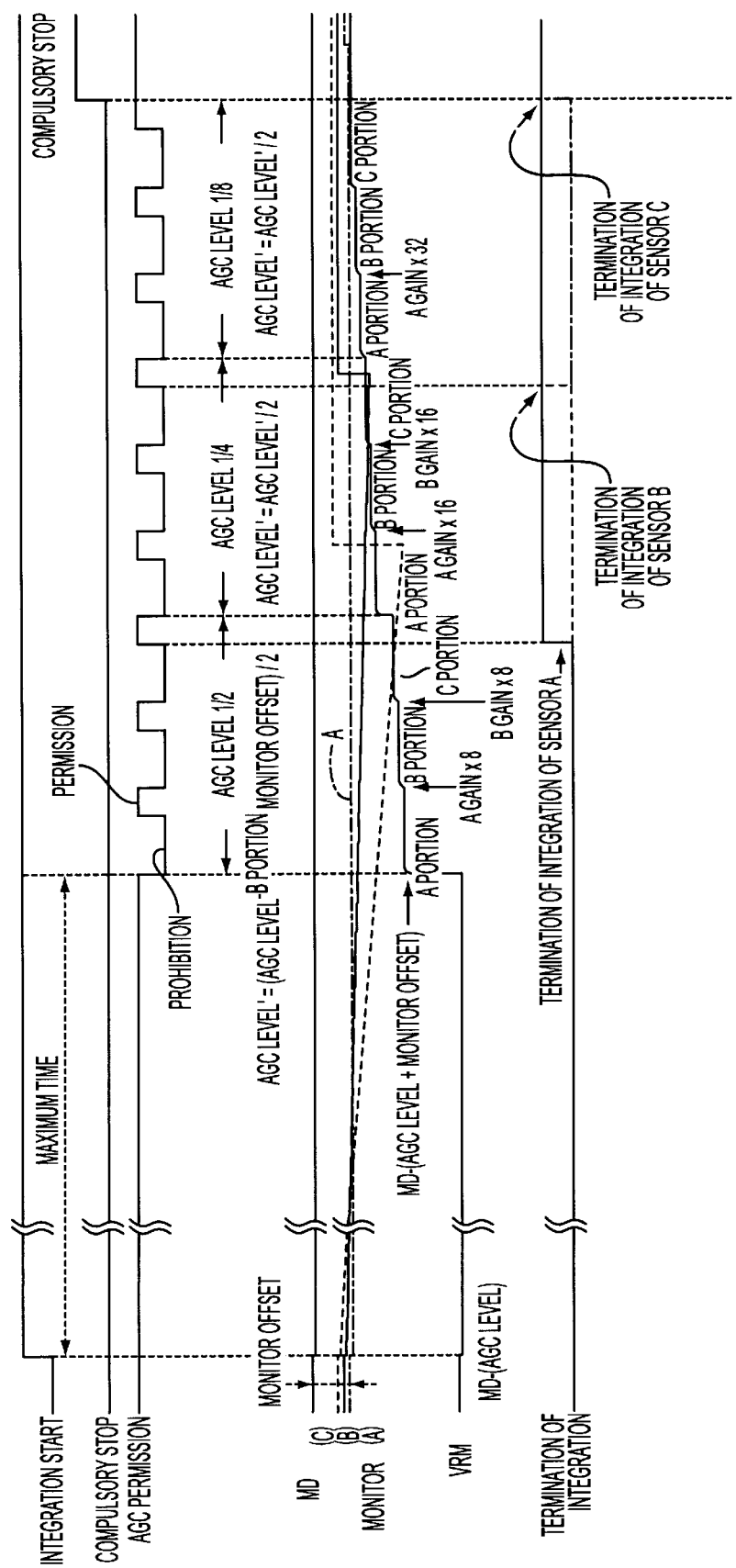
FIG. 7 is another timing chart of integral operations of multi-focus detection sensors shown in FIG. 1.

FIG. 7 shows a timing chart of the integration operation when the latter is not completed within the maximum integration time. In this embodiment, the integration completion level VRM is set as follows.

The initial integration completion level (with reference to the second sensor 212B):

VRM=MD−(AGC level)

wherein the AGC level is defined by a difference between the reference voltage VS and VAGC and is normally set in the second sensor 212B.

$\frac{1}{2}^n$ integration completion level

A monitor sensor MA:

VRM=MD−(((AGC level)−(monitor offset MBoffset))/$2^n$+(monitor offset MAoffset))

B monitor sensor MB:

VRM=MD−(((AGC level)−(monitor offset MBoffset))/$2^n$+(monitor offset MAoffset))

C monitor sensor MC:

VRM=MD−(((AGC level)−(monitor offset MBoffset))/$2^n$+(monitor offset MCoffset))

In this embodiment, the main CPU 35 functions as a gain setting means for calculating and setting the AGC level and ((AGC level)−(monitor offset MBoffset))/$2^n$+(each monitor offset) to thereby set the gain of the integration value.

The operation of the single lens reflex camera having a multipoint autofocusing system according to the present invention will be discussed below with reference to FIGS. 8 through 16.

<Main Operation>

Figure 8:
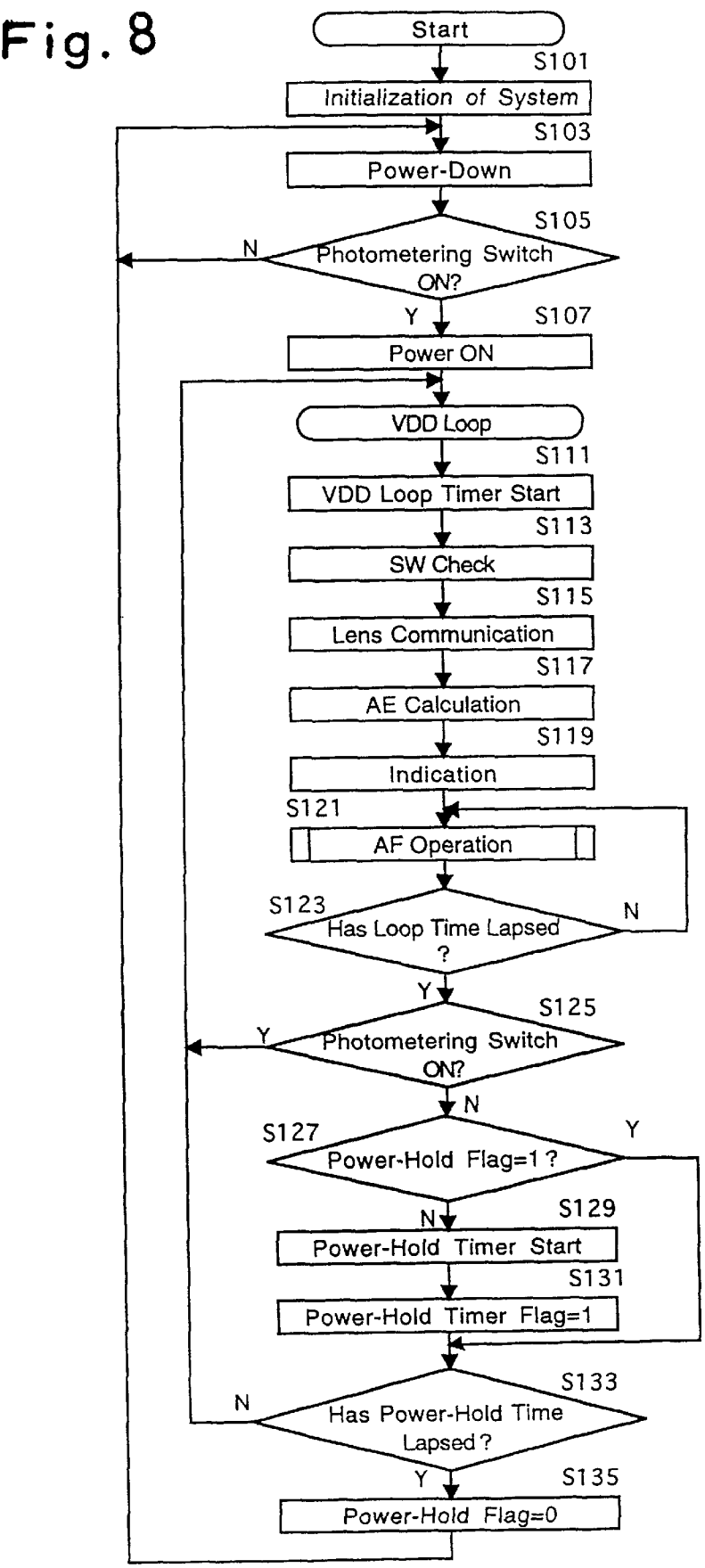
FIG. 8 is a flow chart of main operations in the single lens reflex camera shown in FIG. 1.

FIG. 8 shows a flow chart of the main operation of the single lens reflex camera. In the main operation, when the photometering switch SWS is turned ON, the photometering operation and the exposure calculation (AE operation) are carried out to obtain an optimal diaphragm value and a shutter speed. Thereafter, the focus detection and lens movement (AF operation) are carried out to move the focusing lens 53 to a focal position in accordance with the defocus detected by any of the sensors 212A through 212C. When the release switch SWR is turned ON, the exposure operation is performed at the diaphragm value and the shutter speed obtained in the AE operation.

When a battery is loaded, the control enters the main routine. In the main routine, the RAM 35b is initialized (step S101). No power is supplied to elements or circuits other than the CPU 35 before the photometering switch SWS is turned ON (steps S103, S105). If the photometering switch SWS is turned ON, the electrical power is supplied to the peripheral devices or circuits to perform the operation of the VDD loop (step S107).

In the VDD loop operation, the VDD loop timer starts at step S111, and the state of the switches is checked (step S113). Thereafter, the lens communication with the lens CPU 61 is carried out to input the lens data such as the open diaphragm value, the minimum diaphragm, or the focal distance data, etc. (S115).

Thereafter, the AE operation is carried out (S117), and the photographing data, such as the shutter speed obtained by the calculation, is indicated (S119). The AE operation refers to an operation in which the brightness of the object is measured by the photometering IC 18 and the most appropriate shutter speed and diaphragm value at a predetermined exposure mode, for example, at a program exposure mode, in accordance with the brightness data or the film sensitivity data, etc.

When the shutter speed and the diaphragm value are determined, the AF operation is carried out (step S121) in which the focusing lens 53 is moved to focus on the object. The AF operation is repeated in the loop operation time (step S123).

After the lapse of the loop operation time, the state of the photometering switch SWS is checked. If the photometering switch SWS is turned ON, the control is returned to the VDD loop operation (S125, S111).

If the photometering switch SWS is turned OFF, whether or not a power hold flag is set is checked. If no power hold flag is set, the power hold timer starts, and the power hold flag is set. The VDD loop operations are repeated until the set time of the power hold timer is up (S125, S127, S129, S131, S133, S111). After the lapse of the power hold time, the power hold flag is cleared and the control is returned to the power down operation (S133, S135, S103).

<AF Operation>

Figure 9:
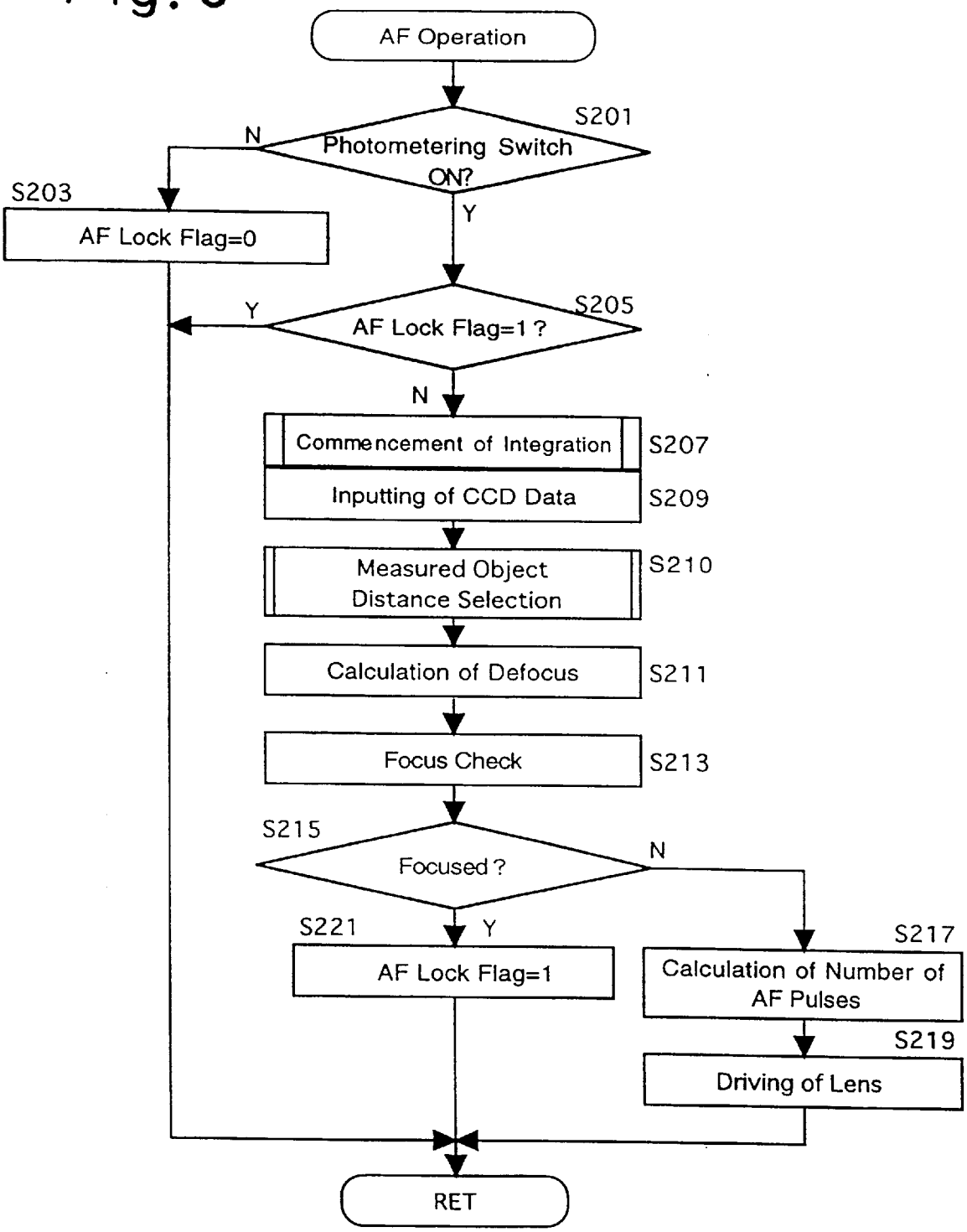
FIG. 9 is a flow chart of an AF operation in the single lens reflex camera shown in FIG. 1.

The AF operation which is called at step S121 will be described below in more detail with reference to FIG. 9. In the AF operation, whether or not the photometering switch SWS is turned ON is checked (S201). If the photometering switch SWS is OFF, the AF lock flag is cleared and the control is returned (S201, S203). The AF lock flag is set once the focused state is obtained. The AF lock flag corresponds to a focus-lock mode at which once the lens is focused on the object, the focused state for the object is held.

If the photometering switch SWS is turned ON, whether or not the AF lock flag is set is checked. If the AF lock flag is set, the control is returned. If no focused state is obtained, i.e., if no AF lock flag is set, the integration operations of the sensors 212A, 212B and 212C are commenced (S205, S207). When the integration operation is finished, the CCD video data is input and the measured object distance selection operation is carried out to select one focus detection zone (sensor). Consequently, the defocus amount for the selected detection zone is calculated (S209, S210, S211). Whether or not the lens is focused is checked in accordance with the defocus. In case of out-of-focus, the number of AF pulses is calculated based on the defocus amount and the K value data, so that the AF motor 39 is driven in accordance with the number of AF pulses (S213, S215, S217, S219). If the lens is focused, the AF lock flag is set and the control is returned (S215, S221).

<Commencement of Integration Operation>

Figure 10:
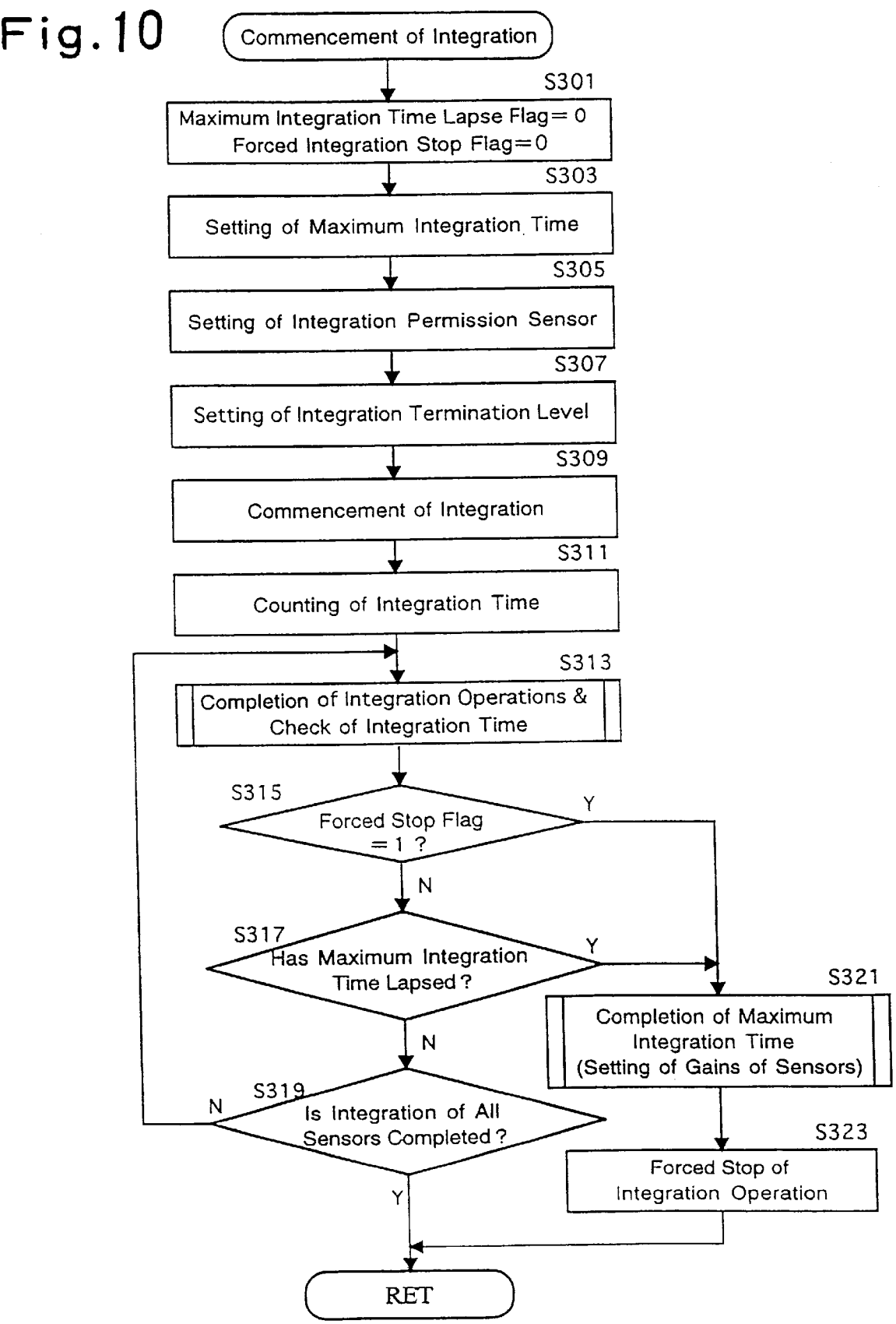
FIG. 10 is a flow chart of an integral commencement operation in the single lens reflex camera shown in FIG. 1.

The commencement of the integration operation at step S207 will be discussed below with reference to FIG. 10. In the integration operation, the multifocus detection sensor unit 21 commences the integration operation and stops the integration operation when appropriate integration values are obtained.

The maximum integration time expiration flag and the forced integral stop flag are cleared (S301). The maximum integration time expiration flag represents that the integration value of the sensor 212A, 212B or 212C to be used (and the corresponding monitor sensor) does not reach the integration completion level VRM (no integration operation is complete) when a predetermined maximum integration time has lapsed. The forced integral stop flag represents that the integration value does not reach the integration completion level VRM but nevertheless, the integration operation is forcedly stopped. Note that in the illustrated embodiment, all the sensors 212A, 212B and 212C are used.

The maximum integration time is set; the integral permission flags 212A through 212C are set; and the AGC level (VAGC) is set (S303, S305, S307). Thereafter, the integration operation starts and the integration time is counted (S309, S311).

The following operations are repeated until the integration operation of the permitted sensors 212A through 212C is completed or the maximum integration time lapses (S313 through S323). Namely, the integration completion and the integration time of the sensors 212A through 212C which are permitted to carry out the integration operation are checked (S313). Thereafter, whether or not the forced integral stop flag is set is checked (S315). If no forced integral stop flag is set, whether or not the maximum integration time tmax has lapsed is checked (S317). If no maximum integration time has lapsed, whether or not the integration operations of all the sensors 212A through 212C are completed is checked (S319). If the integration operation of any one of the sensors 212A through 212C is not complete, the control is returned to step S313.

If the integration operations of all the sensors 212A through 212C are completed, the control is returned (S319). If the forced integral stop flag is set or the maximum integration time tmax has lapsed, the integration operation of any of the sensors 212A, 212B and 212C of which the integration operation has not yet been completed is forcedly stopped (S323) and the control is returned.

<Lapse of the Maximum Integration Time>

Figure 11:
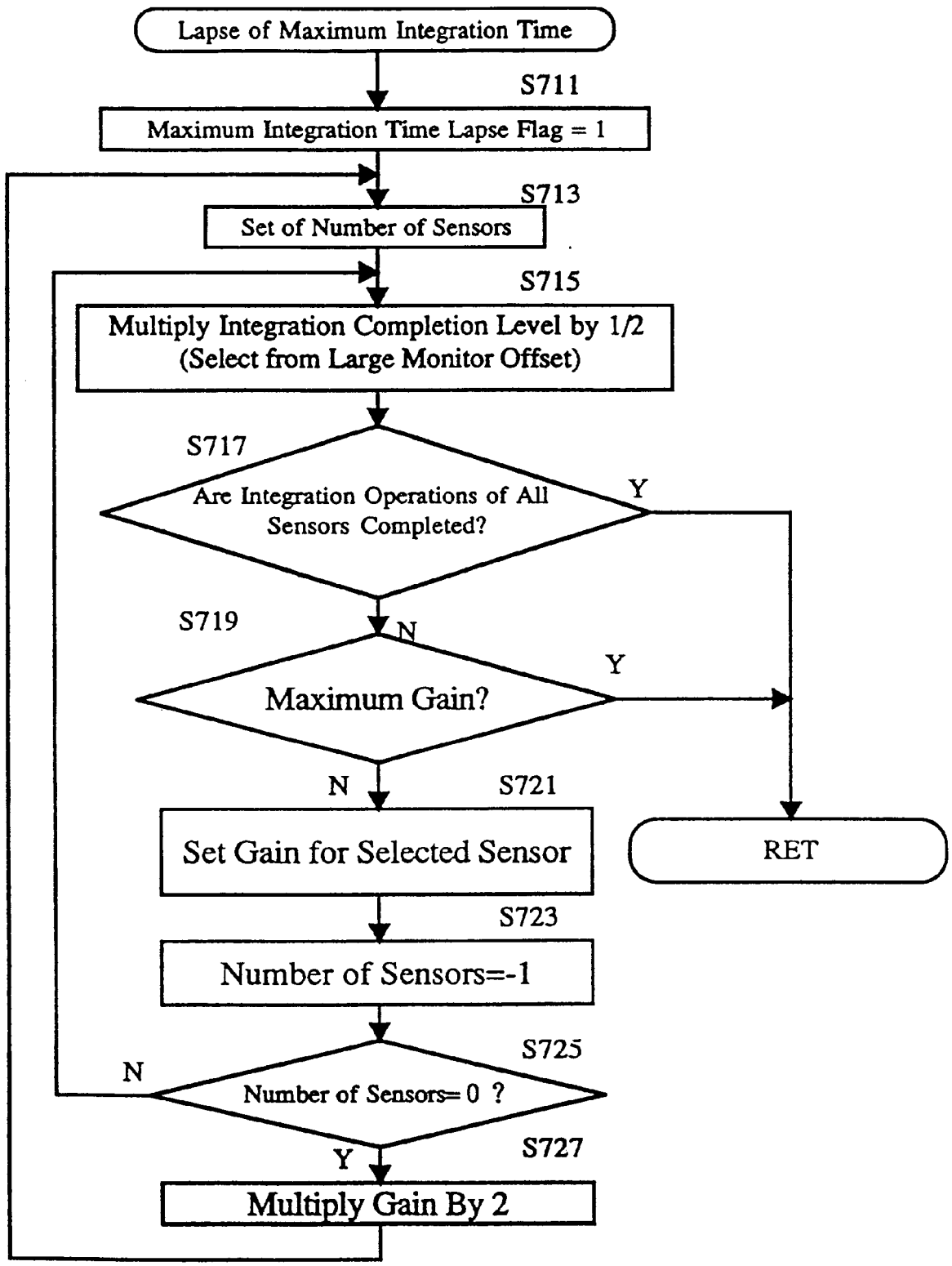
FIG. 11 is a flow chart of a maximum integration time termination operation in the single lens reflex camera shown in FIG. 1.

The operation after the lapse of the maximum integration time will be described below with reference to FIG. 11. This operation refers to an operation in which the gain (amplification) of the integration value is multiplied by 2n power in accordance with the integration value of the monitor sensor when the integration operation has not been completed within the maximum integration time. The multiplication is carried out by the amplifier 226. If there is a difference in the integration value between the monitor sensors MA, MB, MC and the corresponding sensors 212A, 212B, 212C, and in particular if the monitor offset MAoffset of the monitor sensor MA or the monitor offset MCoffset of the monitor sensor MC is smaller than the monitor offset MBoffset of the reference monitor sensor MB, it can be judged that the integration value of the reference monitor sensor MB has reached the integration completion level VRM, but the integration value (absolute value) of the monitor sensor MA or MC has not yet reached the integration completion level VRM. Consequently, the integration value of the monitor sensor MA or MB is gained by multiplication of 2n power. If this occurs, the gained integration value may exceed the maximum integral range and thus the latter is saturated.

To prevent this, the monitor offsets MAoffset, MBoffset and MCoffset of the monitor sensors MA, MB, MC are corrected in the order from the larger offset toward the lower offset to control the gain of the amplifier 226. In the embodiment illustrated in FIG. 6, MAoffset>MBoffset>MCoffset.

Note that in this embodiment in which the initial value of the gain is 4, the gains multiplied by 2, 4 and 8 are 8, 16 and 32, respectively.

In this operation, the maximum integration time lapse flag which represents that the maximum integration time has lapsed is set "1", and the number of sensors 212A through 212C which are being used (three sensors in the illustrated embodiment) is stored in the RAM 35*b* (S711, S713).

The AGC level is corrected in accordance with the largest monitor offset value and is multiplied by ½, and the integration control circuits 225A through 225C of the monitor sensors MA, MB, MC corresponding to the offset value are actuated. Namely, the integration control circuits 225A through 225C compare the corrected ½ integration completion level VRM with the corresponding integration values. When the integration operation of all of the sensors 212A through 212C is completed or when the maximum gain (i.e., 8 times) is set even if any sensor has not completed the integration operation, the control is returned (S717, S719).

If the integration operation of the selected sensors 212A through 212C is not completed and the maximum gain (8 times) is not set, the gains of the selected sensors 212A through 212C are set and one is subtracted from the number of the sensors. The operations from steps S715 to S725 are repeated until the subtracted value becomes 0 (S721, S723, S725).

When the operations from steps S715 to S725 are performed for all the sensors 212A through 212C, the gain is multiplied by two, and thereafter, the control is returned to step S715 to repeat the operations from steps S715 to S725.

When the integration operation of all of the sensors 212A through 212C is completed or when the maximum gain is set even if any sensor has not completed the integration operation, the control is returned. Thereafter, the integration operation of the sensor(s) 212A, 212B or 212C that has not completed the integration operation is forcibly stopped.

Consequently, if the integration value of the monitor sensor does not reach the integration completion level VRM within the maximum integration time, since the gain is controlled in accordance with the corrected integration completion level VRM of each monitor sensor, the integration value can be amplified at an appropriate gain.

In the embodiment illustrated in FIG. 7, the integration value of the third monitor sensor MC reaches the ½ integration completion level corrected using the monitor offset MCoffset as a result of the first operation, so that the integration operation of the third sensor MC 212 is completed. The gains of the first and second sensors 212A and 212B that have not completed the integration operation are multiplied by two. The integration operation of the second monitor sensor MB is not completed after the correction of the gain using the monitor offset MBoffset by the second operation. The integration operation of the second monitor sensor MB is completed after the correction of the gain using the monitor offset MCoffset by the third operation with which the integration value reaches the ¼ integration completion level. The gain of the sensors 212A and 212B are multiplied by 4. Since the integration value of the first monitor sensor MA has not reached the corrected ⅛ integration completion level by the third operation, the integration operation of the first monitor sensor MA is compulsively stopped and the gain is multiplied by 8.

The reason that the integration completion level VRM is corrected in the order of the value of the monitor offset, i.e., the correction of the integration completion level begins with the larger monitor offset after the lapse of the maximum integration time, is to prevent the gain from becoming too high.

<Input Operation of CCD Data>

The input operation of the CCD data at step S209 will be discussed below with reference to the flow chart shown in FIG. 12.

Figure 12:
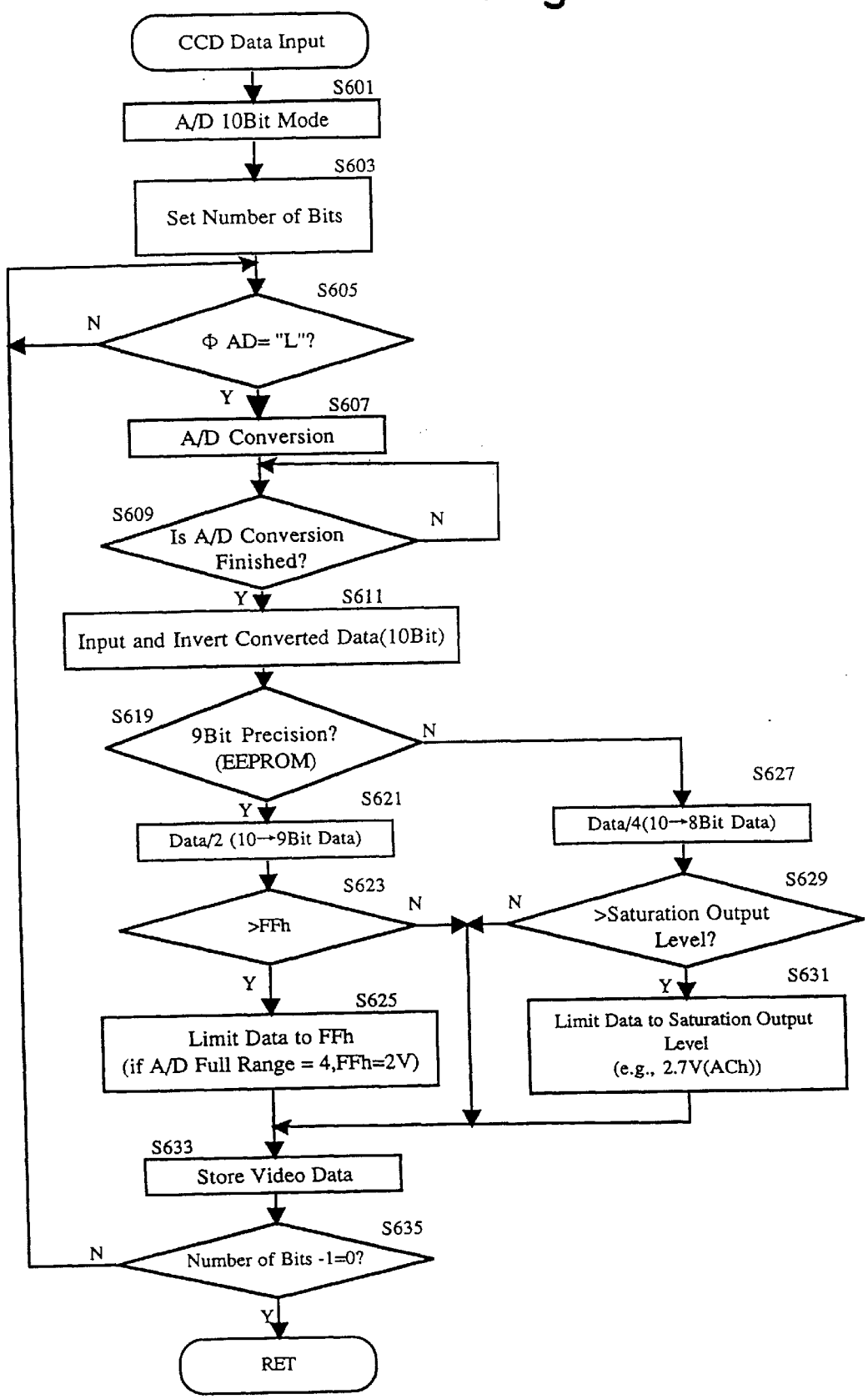
FIG. 12 is a flow chart of a CCD data input operation in the single lens reflex camera shown in FIG. 1; and, FIGS. 13 through 16 are flow charts of an object distance data selection operation in the single lens reflex camera shown in FIG. 1.

In the embodiment shown in FIG. 12, the analog video signals successively supplied from the clamping circuit 227 and input to the CPU 35 for each pixel are converted to digital video signals by the A/D converter 35*e* incorporated in the CPU 35. If the converted video data is data on which the integration operation has been completed within the maximum integration time without a compulsory stop of the integration operation, the video data is multiplied by the ratio to the reference output, so that the product is stored in the RAM 35*b* as video data. The video data on which the integration operation has been compulsively stopped or the maximum integration time has lapsed is stored in the RAM 35*b* since the gain control therefor has been effected by the amplifier 226.

The operations mentioned above are carried out for all the pixels of the sensors 212A through 212C. Note that in the illustrated embodiment, the video data is converted to 10 bit digital data by the A/D converter 35*e*. Moreover, the 10 bit digital data is converted to 9 bit or 8 bit digital data depending on the precision of the data used in the focus detection calculation.

In the CCD data input operation, the A/D converter 35*e* is set in 10 bit mode, and the number of bits (pixels) is set in the built-in counter (S601, S603). After the A/D conversion synchronization signal φAD becomes a low level, the A/D converter 35*e* begins the A/D conversion (S605, S607, S609). Upon completion of the A/D conversion, the converted digital data is input and inverted (S609, S611). The video signal becomes weak as the brightness increases with respect to the video reference value. To this end, the signal inversion is carried out to invert the video signal, i.e., to increase the intensity of the video signal as the brightness increases.

Whether the precision of 9 bit data is required is checked at step S619. The precision of 9 bit or 8 bit data is set depending on the maximum output voltage of the multifocus detection sensor unit 21 or the property of the camera, etc., and is stored in the EEPROM 43 upon manufacturing.

If the precision of 9 bit data is set, the 10 bit data is divided by 2 to convert to 9 bit data (S619, S621). Whether the 9 bit data is above FFh (hexadecimal number; 255 in decimal number) is checked. If the 9 bit data is above FFh, the limit operation is carried out to limit the data to FFh. The data is then stored in the RAM 35*b* as video data (S623, S625, S633). The limit operation refers to an operation in which for example if the full range of the A/D converter 35*e* is 4V (volts), the maximum video data (input voltage) is cut at a value corresponding to 2V. If the 9 bit data is below FFh, it is stored in the RAM 35*b*.

If the precision of 8 bit data is set, the 10 bit data is divided by 4 to obtain 8 bit data (S619, S627). Thereafter, whether the converted data exceeds the saturation output level is checked. If the converted data exceeds the saturation level, the data is limited to the saturation level and is stored in the RAM 35*b* as video data (S627, S629, S631, S633). In the illustrated embodiment, the saturation level corresponds to, for example, 2.7 V (ACh). If the converted 8 bit data is below the saturation level, the data is stored in the RAM 35*b* as video data (S627, S629, S631, S633).

If the storage of the video data is completed, one is subtracted from the number of the bits in the counter. If the bit number after subtraction is not 0, the control is returned to step S605 to repeat the operations from S605 to S635. Namely, the operations from S605 to S635 are carried out for the video signals VIDEO of all the sensors 212A through 212C.

With the adjustment of the precision of the A/D conversion as mentioned above, if the saturation output voltages of the sensors 212A through 212C are out of the full range of the A/D converter 35*e*, the AGC level is set on the assumption that the saturation output voltage is one-half the full range of the A/D converter 35*e*, so that the 9 bit digital data can be obtained, thus resulting in an extended range and increased precision. The precision thus obtained is substantially identical to the precision of data which is obtained by the conversion of the A/D converter 35*e* at the precision of 8 bit data when the AGC level is set such that the saturation output voltage is about 70% of the full range of the A/D converter 35*e* if the saturation output voltage of the sensor is within the full range of the A/D converter 35*e*.

Although the CPU 35 is provided with the 10 bit A/D converter 35*e* incorporated in the CPU 35 as mentioned above, the present invention is not limited thereto and can be applied to the A/D converter 35*e* of 16 bits or more than 16 bits.

The measured object distance selection operation which is one of the most important features of the present invention will be discussed below. In a single lens reflex camera to which the present invention is applied, the focus detection operation is carried out by the three sensors 212A through 212C. Among the measured object distances, the closest object is selected and the focusing operation is carried out for the closest object. This embodiment is particularly advantageous if the reliability of the object distances obtained through the sensors 212A through 212C is low or if no object distance can be obtained from the sensor 212A, 212B or 212C.

In the AF operation, the integral operations of the sensors 212A, 212B and 212C are carried out, and thereafter, the integration values (video signals VIDEO) of all the pixels (photodiodes) and the light receivers A1, A2; B1, B2; C1, C2 of the sensors 212A, 212B and 212C are converted to digital data by the A/D converter 35*e* and are stored in the RAM 35*b*. Image data on the integration values of the photodiodes of each pair of light receivers are stored in the RAM 35*b* for each piece of data of the light receivers A1, A2; B1, B2; C1, C2. The operations mentioned above are the integration operation and the CCD data input operation.

The CPU 35 reads the image data stored in the RAM 35*b* and detects a phase difference between a pair of light receivers, using a correlation method. Consequently, the defocus can be obtained in accordance with the phase difference thus obtained. The foregoing corresponds to the defocus calculation, object distance calculation or AF object distance calculation operation.

In a known correlation method, it is impossible to detect a precise amount of defocus, if the object contrast is low, as in a white wall, if the object distance from the camera considerably differs at portions thereof, as in a three-dimensional object, or if no precise defocus can be obtained, as in a reiterative pattern.

To this end, in the embodiment, the differences between the adjacent image data are successively added to obtain the contrast, so that whether the contrast thus obtained is low can be judged. Moreover, the reliability of the data is judged based on the correlative function (coincidence in the image data group of a pair of light receivers) obtained by the correlation method. Based on the judgement result, one sensor (object distance and focus detection zone) to be used for the focusing operation is selected.

(1) If no effective defocus of all the sensors can be obtained, the object distance measurement NG operation is carried out and the impossibility of focusing is indicated.

(2) If the effective defocus is obtained but the data (object images) of all the sensors represents low contrast, the following operations are carried out:

(2-1) if the effective defocus for the center sensor 212B is obtained, the center sensor 212B (i.e., the defocus thereof) is selected;

(2-2) if no effective defocus for the center sensor 212B is obtained, the defocus corresponding to the closest object distance is selected;

(2-2-1) The sensor which has been selected in the previous selection operation is selected with a priority.

The "priority" refers to the selection of the defocus of the sensor which has been selected in the previous selection operation if the absolute value of the previously selected defocus is smaller than a predetermined value, even if there is another defocus whose absolute value is smaller than the absolute value of the previously selected defocus.

(3) if the effective defocus is obtained, but data which does not represent low contrast is included, the defocus which represents the closest object distance is selected from the data. Upon selection, (3-1) the previously selected sensor is selected with priority, (3-2) the center sensor 212B is selected with priority.

The defocus amount is defined as "vector" determined by a distance between an image of an object to be photographed and the film plane. It is known that (i) the defocus amount is zero when an image position meets the film plane; (ii) the defocus among is plus (+) when an image position is behind the film plane along the optical axis of the photographing lens; and (iii) an defocus amount is minus (−) when an image position is before the film plane along the optical axis of the photographing lens. It goes without saying that when the defocus amount is zero, the in-focus state is obtained. A distance up to an object under the in-focus state is defined as an object distance, and the position of the object is defined as a focusing point.

When the defocus amount is plus (+), an object is located closer than a focusing point. Furthermore, the more the defocus amount (with respect to an absolute value) is the closer the object stands (from a camera).

When the defocus amount is minus (−), an object is located farther than a focusing point. Furthermore, the less the defocus amount (with respect to an absolute value) is the farther the object stands (from a camera).

According to the above definition, the defocus amount corresponding to the shortest distance is the largest defocus amount (non-absolute value), that is, the defocus amount +1 is larger than the defocus amount −10. In the embodiment, the largest defocus amount means the largest output (defocus amount) among the A sensor 212A, the B sensor 212B and the C sensor 212C.

Furthermore, the following selections can be effected in this embodiment.

Choice 1. Whether or not the low contrast data is used;
Choice 2. If all data represent low contrast, whether the center sensor 212B is selected or the defocus corresponding to the closest object distance is selected;
Choice 3. If all data represent low contrast and no effective data is obtained from the center sensor 212B, whether the measurement NG operation is effected (automatic focusing operation is terminated) or the defocus corresponding to the closest object distance is selected.

The selection results are written in the EEPROM 43 in advance by a manufacturer, so that a photographer can select the choices and write the same in the EEPROM 43. In this embodiment, choice 1 is discriminated using the bit data (low contrast-non selection bit) which is not selected for the low contrast object. "1" represents that the data is used and "0" represents that the data is not used. Choice 2 is discriminated using the bit data (all sensor low contrast-B sensor selection bit) which is used to select the second sensor 212B when all data represent low contrast. "1" represents that the second sensor 212B is selected and "0" represents that the defocus corresponding to the closest object is selected. Choice 3 is discriminated using the B sensor NG bit when no effective data is obtained from the second sensor 212B. "1" represents that no object distance can be measured and "0" represents that the defocus corresponding to the closest object is selected.

Figure 13:
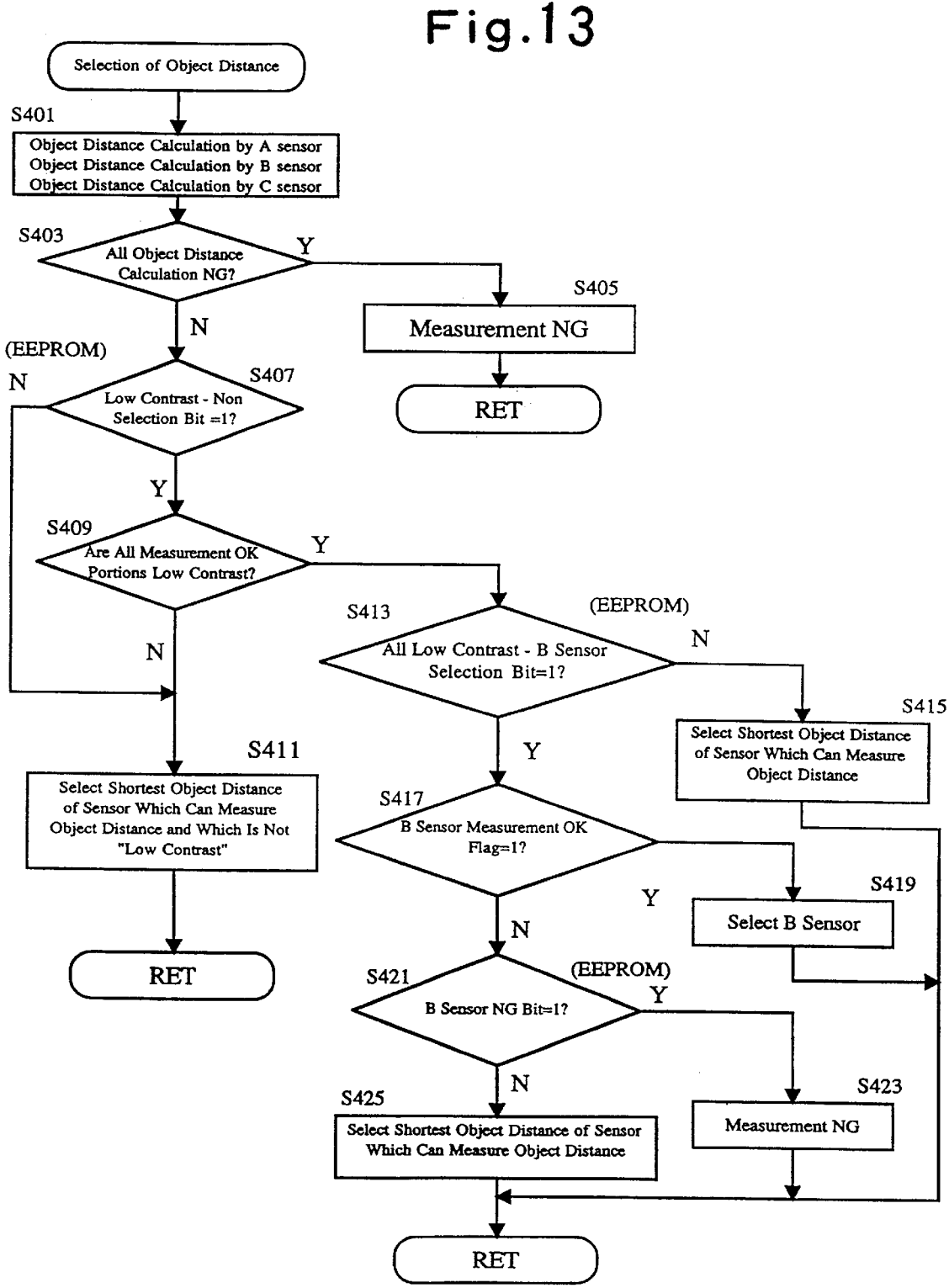

The object distance selection operation will be described below with reference to the flow chart shown in FIG. 13.

In this routine, the object distance calculation is effected for all the image data of the three sensors (S401). Whether or not the object distance calculations are NG (no good) is checked. If all the object distance calculations are NG, the measurement NG operation is carried out and the control is returned (S403; Yes, S405). The measurement NG operation refers, for example, to an operation in which, for example, in the indicator 45 it is indicated that a focusing operation is impossible while the photometering switch SWS is ON, so that other operations such as AF operation, integration commencement operation, object distance selection operation, etc., are prohibited in a predetermined period of time. If the photometering switch SWS is turned OFF and ON again, the control enters the VDD loop operation, the AF operation, integration commencement operation, object distance selection operation, etc., are carried out. Note that the measurement NG operation is not limited to the above mentioned operation.

If there is a sensor which can produce effective measurement data, whether or not the non-selection bit for the low contrast object is set "1" is checked (S403, No, S407). If the bit is not set "1", the sensor (defocus) corresponding to the closest object distance is selected from the sensors by which the object distance can be measured and which do not represent low contrast (S409, No, S411).

If the non-selection bit for the low contrast object (low contrast-non selection bit) is set "1" and if all the sensors which can measure the object distance represent low contrast, whether or not the bit which represents the selection of the second sensor when the contrast of all the objects is low is set "1" is checked (S409; Yes, S413). If "1" is not set, the sensor (defocus) corresponding to the closest object distance is selected from the sensors by which the object distance can be measured (S413, No, S415). Conversely, if "1" is set, whether the second sensor measurement OK flag is set "1" is checked. If the flag is set "1", the second sensor 212B is selected and the control is returned (S413, Yes, S417; Yes, S419). If the flag is not set "1", whether or not the second sensor NG bit is set "1" is checked. If "1" is set, the measurement NG operation is effected and the control is returned (S417; No, S421; Yes, S423). If the NG bit is not set "1", the sensor (defocus) corresponding to the closest object distance is selected from the sensors by which the object distance can be measured and the control is returned (S421; No, S425).

Figure 14:
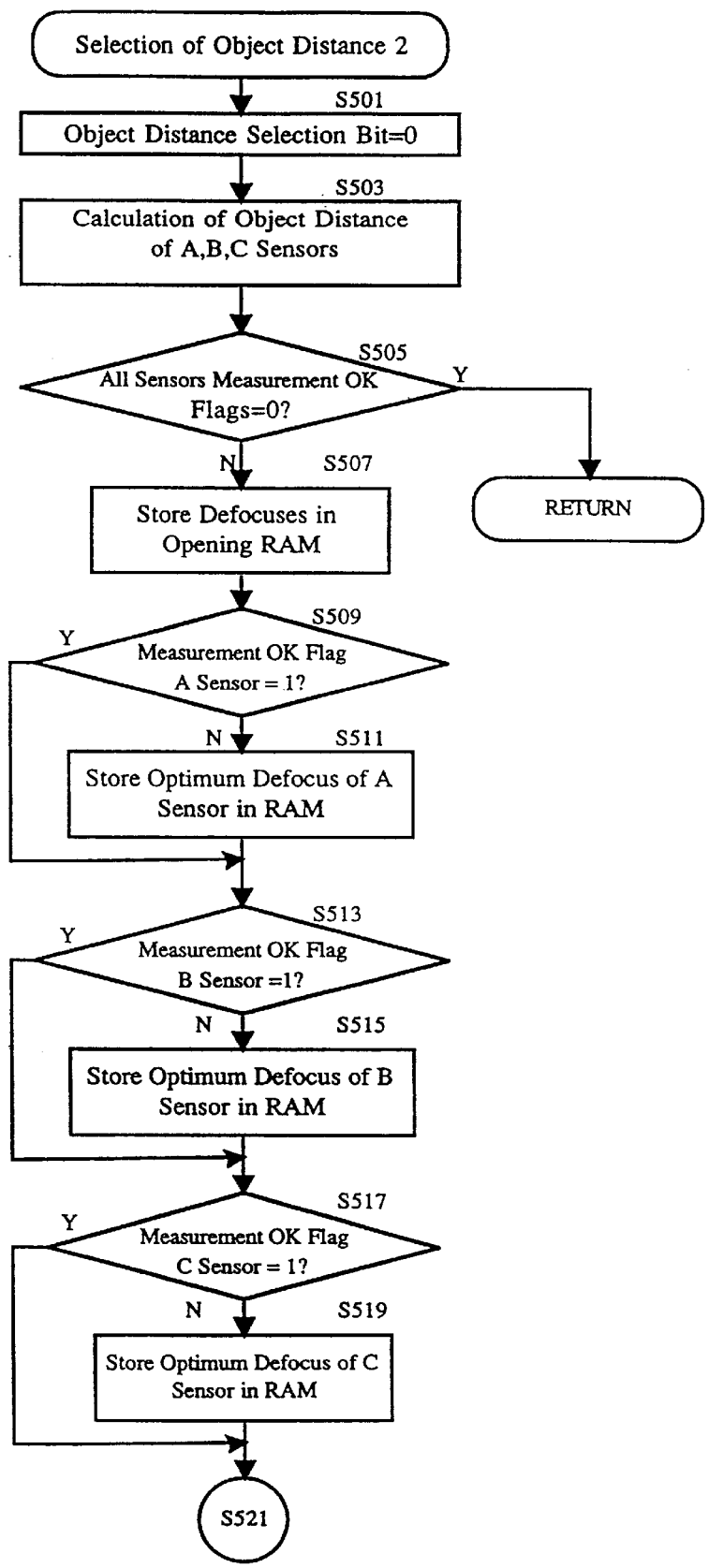
Figure 15:
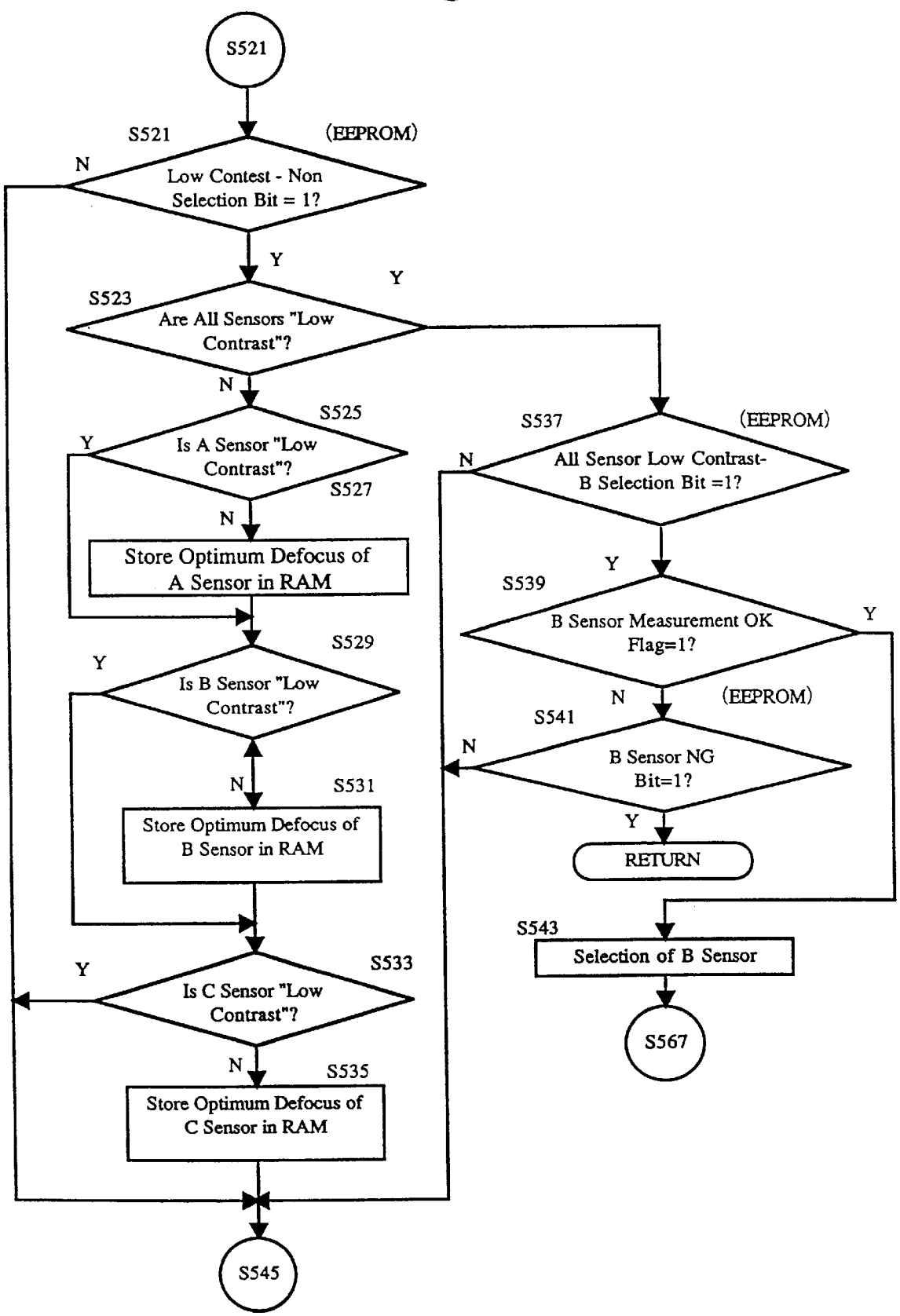
Figure 16:
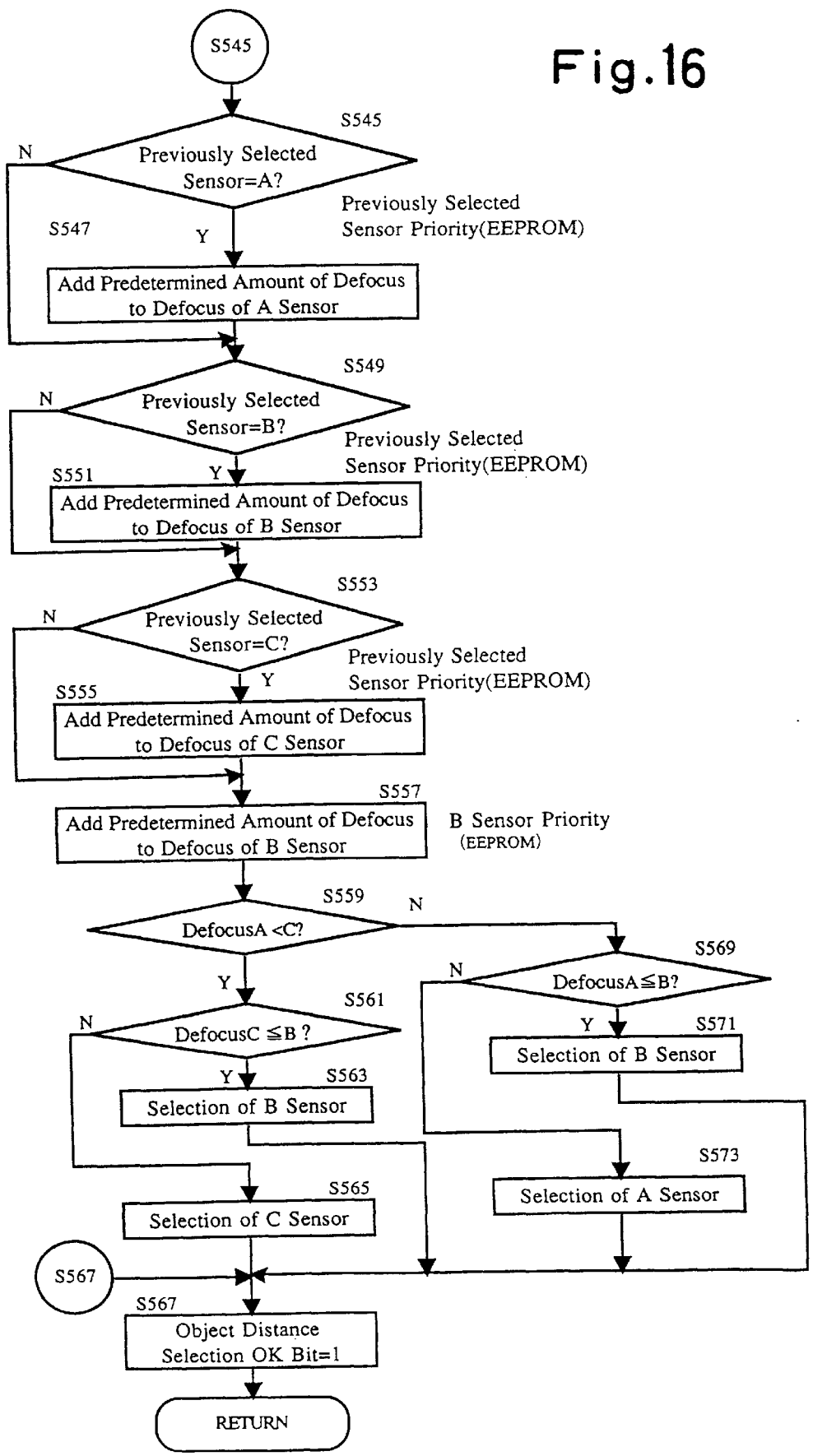

Another embodiment of the distance selection operation will be explained below with reference to the flow chart shown in FIGS. 14 through 16. This embodiment refers to the first embodiment in more detail.

In this operation, the measured distance selection OK bit is cleared ("0" is set) at step S501. The distance selection OK bit is a flag to discriminate whether or not the measured distance is selected. If "0" is set, no selection is effected and if "1" is set, the object distance is selected.

The distance calculation for the data of all the sensors 212A, 212B and 212C is carried out (S503). Whether or not the measurement OK flags for the respective sensors are all "0" is checked. If the measurement OK flags are all "0", the control is returned (S505; Yes). The measurement OK flag is used to discriminate whether an appropriate object distance is obtained. If an appropriate object distance is obtained, the flag is set "1", and if no appropriate object distance is obtained, the flag is set "0".

If an appropriate object distance is obtained through at least one of the sensors 212A through 212C, the defocus thus obtained is stored in the operation area of the RAM 35b (S505; No, S507).

The sensor measurement OK flag is checked for each sensor. If "1" is not set, the longest object distance is written in the RAM 35b at a predetermined address at which the defocus obtained by the sensor is to be written. Namely, if the first sensor (A sensor) measurement OK flag is not set "1", the longest object distance is set at a predetermined address of the RAM 35b in which the defocus obtained by the first sensor (A sensor) 212A is to be written (S509; No, S511). If the second sensor (B sensor) measurement OK flag is not set "1", the longest object distance is set at a predetermined address of the RAM 35b in which the defocus obtained by the second sensor (B sensor) 212B is to be written (S513; No, S515). If the third sensor (C sensor) measurement OK flag is not set "1", the longest object distance is set at a predetermined address of the RAM 35b in which the defocus obtained by the third sensor (C sensor) 212C is to be written (S517; No, S519).

The "longest object distance" refers to the largest absolute value of the negative defocus and the "closest (or shortest) object distance" refers to the largest absolute value of the positive defocus, respectively.

The defocus for the sensor from which no effective object distance can be obtained through the above-mentioned operations from steps S509 to S519 is set at a predetermined address of the RAM 35b.

Whether the low contrast-non selection bit is set "1" is checked (S521). The low contrast-non selection bit is adapted to discriminate whether the data obtained from the sensors 212A through 212C is selected at the low contrast, If "1" is set, no selection is effected and if "0" is set, the data is selected, respectively.

If the low contrast-non selection bit is set "1", and if the contrast of the object image corresponding to at least one sensor is not low, whether the A sensor 212A is "Low Contrast" (i.e., the object image in the A sensor 212A has a low contrast), whether the B sensor 212B is "Low Contrast" (i.e., the object image in the B sensor 212B has a low contrast), and whether the C sensor 212C is "Low Contrast" (i.e., the object image in the C sensor 212C has a low contrast) are checked (S521; Yes, S523; No, S525; S529, S533).

If the A sensor 212A is "Low Contrast", the longest object distance is set at a predetermined address of the RAM 35b in which the defocus obtained by the first sensor (A sensor) 212A is to be written (S525; No, S527). If the B sensor 212B is "Low Contrast", the longest object distance is set at a predetermined address of the RAM 35b in which the defocus obtained by the second sensor (B sensor) 212B is to be written (S529; No, S531). If the C sensor 212C is "Low Contrast", the longest object distance is set at a predetermined address of the RAM 35b in which the defocus obtained by the third sensor (C sensor) 212C is to be written (S533; No, S535).

If the low contrast-non selection bit is set "1", even if the measurement can be effected by a sensor which is "Low Contrast", the defocus corresponding to the longest object distance is written at a predetermined address of the RAM 35b as the defocus of that sensor.

If all the objects corresponding to the sensors 212A through 212C are at low contrast, whether the all sensor low contrast-B sensor selection bit is set "1" is checked (S523; Yes, S537). If "1" is set, whether or not the B sensor measurement OK flag is set "1" is checked. If the B sensor measurement OK flag is not set "1", whether or not the B sensor NG bit is set "1" is checked. If the B sensor NG bit is set "1", the control is returned (S537; Yes, S539; No, S541; Yes). The B sensor NG bit refers to a bit data which is used to determine whether the automatic focusing operation is stopped if no effective object distance can be obtained by the B sensor 212B and if the B sensor is "Low Contrast" or the measured object distance is NG. The B sensor NG bit is written in the EEPROM 43 upon manufacturing. If the B sensor measurement OK flag is set "1", the B sensor 212B is selected since an effective object distance has been obtained by the B sensor. Thereafter, the measurement OK bit is set "1" and the control is returned (S537; Yes, S539; Yes, S543, S567).

If the all sensor low contrast-B sensor selection bit is not set "1", or if the B sensor measurement OK flag is not set "1" and B sensor NG bit is not set "1" even if the all sensor low contrast-B sensor selection bit is set "1", the control proceeds to step S545 (S537; No, S545, or S537; Yes, S539; No, S541; No, S545).

The operation from steps S545 to S555 are carried out to provide the priority on the defocus of the previously selected sensor, since the previously selected sensor can be considered relatively reliable.

Namely, after the previously selected sensor is detected, a predetermined amount of defocus is added to the defocus of the previously selected sensor. First, whether or not the A sensor 212A has been selected in the previous operation is checked. If the A sensor 212A is a previously selected sensor, a predetermined amount of defocus is added to the defocus of the A sensor 212A to give a priority on the A sensor 212A.

The amount of defocus to be added is written in the EEPROM 43 in advance and is determined depending on the degree of priority to be given to the previously selected sensor.

At step S545, whether or not the A sensor 212A has been selected in the previous operation is checked. If the A sensor 212A is a previously selected sensor, the defocus of the A sensor 212A stored in the RAM 35b is replaced with the defocus plus a predetermined amount of defocus and thereafter, the control proceeds to step S549 (S545; Yes, S547, S549). If the previously selected sensor is not the A sensor 212A, the control proceeds to step S549 (S545; No, S549).

At step S549, whether or not the B sensor 212B has been selected in the previous operation is checked. If the B sensor 212B is a previously selected sensor, the defocus of the B sensor 212B stored in the RAM 35b is replaced with the defocus plus a predetermined amount of defocus and thereafter, the control proceeds to step S553 (S549; Yes, S551, S553). If the previously selected sensor is not the B sensor 212B, the control proceeds to step S553 (S549; No, S553).

At step S553, whether or not the C sensor 212C has been selected in the previous operation is checked. If the C sensor 212C is a previously selected sensor, the defocus of the C sensor 212C stored in the RAM 35b is replaced with the defocus plus a predetermined amount of defocus and thereafter, the control proceeds to step S557 (S553; Yes, S555, S557). If the previously selected sensor is not the C sensor 212C, the control proceeds to step S557 (S553; No, S557).

Note that the previously selected sensor is written in the RAM 35b.

At step S557, a predetermined amount of defocus is added to the defocus of the B sensor 212B stored in the RAM 35b, and the modified defocus thus obtained is written in the RAM 35b.

The defocus of the A sensor 212A is compared with the defocus of the C sensor 212C. If the defocus of the A sensor 212A is smaller than the defocus of the C sensor 212C, the defocus of the C sensor 212C is compared with the defocus of the B sensor 212B. If the defocus of the C sensor 212C is identical to or smaller than the defocus of the B sensor 212B, the B sensor 212B is selected. If the defocus of the C sensor 212C is larger than the defocus of the B sensor 212B, the C sensor 212C is selected. Thereafter, the distance selection OK flag is set "1" and the control is returned (S559; Yes, S561; Yes, S563, S567, or S559; Yes, S561; No, S565, S567).

If the defocus of the A sensor 212A is identical to or larger than the defocus of the C sensor 212C at step S559, the defocus of the A sensor 212A is compared with the defocus of the B sensor 212B. If the defocus of the A sensor 212A is identical to or smaller than the defocus of the B sensor 212B, the B sensor 212B is selected. If the defocus of the A sensor 212A is larger than the defocus of the B sensor 212B, the A sensor 212A is selected. Thereafter, the distance selection OK flag is set "1" and the control is returned (S559; No, S569; Yes, S571, S567, or S559; No, S569; No, S573, S567).

The present invention is not limited to the illustrated embodiments. For example, the number of focus detection zones and the detection sensors is not limited to three and can be three or four or more than four. Also, the arrangement of the focus detection zones and the detection sensors is not limited to that of the illustrated embodiments.

As can be understood from the above discussion, according to the present invention, in a focusing system having a CCD line sensor which is adapted to detect an object image and a CPU having an A/D converter incorporated therein to convert the analog output of the CCD line sensor to digital signals, since the precision of the A/D converter is switched, the resolution can be varied in accordance with the output voltage (saturation output voltage) of the CCD line sensor, so that a constant precision can be obtained regardless of the characteristics of the CCD line sensor. Namely, the difference between the full range of the A/D converter and the saturation output voltage of the CCD line sensor is reduced by adjusting the precision of the A/D conversion, so that the saturation output voltage of the CCD line sensor can be processed as data whose level is as close to the full range of the A/D converter as possible. Consequently, if the saturation output voltages of the CCD line sensor differ, the focuses can be detected at an identical precision by the same CPU 35.

According to another aspect of the present invention, since there is provided a multipoint autofocus system including a plurality of light receiving means which receive object images within a plurality of focus detection zones and integrate the electric charges produced by the photoelectric conversion of the optical signals, a plurality of monitor means adjacent to the light receiving means for receiving and integrating the object images within the focus detection zones and for monitoring the integration values of the corresponding light receiving means, an integration control means for stopping the integral operation of the corresponding light receiving means when the integration value by the monitor means reaches a predetermined value by the monitor means, and a correction means for correcting the integration value of the light receiving means whose integral operation has been stopped by the integration control means, in accordance with a correction value to correct a difference in the integration value between the monitor means and the corresponding light receiving means, if the characteristics of the monitor means are deviated from those on design, the integration value of the light receiving means can be corrected to be within the most effective range.

According to yet another aspect of the present invention, since a multipoint autofocus system including a plurality of light receiving means which receive object images within a plurality of focus detection zones and integrate the electric charges produced by the photoelectric conversion of the optical signals, a counter means for counting the integration time of the light receiving means, a plurality of monitor means adjacent to the light receiving means for receiving and integrating the object images within the focus detection zones and for monitoring the integration values of the corresponding light receiving means, an integration control means for stopping the integral operation of the corresponding light receiving means when the integration value by the monitor means reaches a predetermined value by the monitor means; for varying the predetermined value stepwise after the lapse of a predetermined maximum integration time to compare the modified predetermined value with the integration value by the monitor means; and for compulsively stopping the integral operation of all the light receiving means that have not reached the predetermined value, and a gain setting means for comparing the gain of the integration value of the light receiving means that have not reached the predetermined value after the lapse of the maximum integration time, with the predetermined value that has been corrected in accordance with the correction value to correct the integration value of the corresponding monitor means to thereby set the gain is provided, if the integration value does not reach the predetermined value after the lapse of the maximum integration time, no excess gain can be set.

In an embodiment of the present invention, the detected contrast of the object within the focus detection zone is judged. The focus data corresponding to the shortest object distance is selected from those of the focus detection zones in which the contrast of the object is higher than a predetermined value, to control the focus. Consequently, the optical system does not focus on the object of low contrast such as a blue sky as a background of a portrait, and hence the optical system can be effectively and automatically focused on an object which a photographer wants to photograph.

In another embodiment of the present invention, if the contrasts of the objects in all focus detection zones are lower than a predetermined value, the focus data of the object in the center focus detection zone within the image surface is selected, and hence, the optical system can be focused on the center object within the image surface.

In still another embodiment of the present invention, since the defocus of the previously selected focus detection zone has a priority to the current defocus of the focus detection zones that have not been selected in the previous operation, the focus can be detected in accordance with the more reliable defocus data.

In another embodiment of the present invention, since the defocus of the center focus detection zone within the image surface has a priority to the defocus of the other focus detection zones, if the objects in the sensors are located at the substantially same distance, the center focus detection zone in which it is most likely that an object exists is selected with a priority.

What is claimed is:

1. A multipoint autofocus system, comprising:
   a line sensor which receives object images and outputs a signal corresponding to a brightness thereof; and
   a controller having an A/D converter which converts said signal output from said line sensor to 10 bit digital data, and further converts said 10 bit digital data to one of 9 bit and 8 bit digital data,
   wherein a conversion precision of said A/D converter can be varied.

2. The multipoint autofocus system according to claim 1, wherein said line sensor is comprised of a CCD line sensor.

3. The multipoint autofocus system according to claim 2, wherein said 10 bit digital data produced by said A/D converter is converted into 9 bit digital data when a saturation output voltage of said CCD line sensor is less than one-half of a full range of said A/D converter, and wherein said 10 bit digital data produced by said A/D converter is converted into 8 bit digital data when said saturation output voltage of said CCD line sensor is greater than one-half of said full range of said A/D converter.

* * * * *

UNITED STATES PATENT AND TRADEMARK OFFICE
CERTIFICATE OF CORRECTION

PATENT NO. : 6,198,506 B1
DATED : March 6, 2001
INVENTOR(S) : Masahiro Nakata et al.

It is certified that error appears in the above-identified patent and that said Letters Patent is hereby corrected as shown below:

<u>Title page,</u>
Item [73], Assignee, "Asahi Kogaku Kabushiki Kaisha, Tokyo (JP)" should be
-- Asahi Kogaku Kogyo Kabushiki Kaisha, Tokyo (JP) --

Signed and Sealed this

Nineteenth Day of February, 2002

Attest:

JAMES E. ROGAN
*Attesting Officer*  *Director of the United States Patent and Trademark Office*